United States Patent
Redfern et al.

(10) Patent No.: US 10,810,281 B2
(45) Date of Patent: Oct. 20, 2020

(54) OUTER PRODUCT MULTIPLER SYSTEM AND METHOD

(71) Applicant: Texas Instruments Incorporated, Dallas, TX (US)

(72) Inventors: Arthur John Redfern, Plano, TX (US); Donald Edward Steiss, Richardson, TX (US); Mihir Narendra Mody, Karnataka (IN); Tarek Aziz Lahlou, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 82 days.

(21) Appl. No.: 16/057,667

(22) Filed: Aug. 7, 2018

(65) Prior Publication Data
US 2018/0373678 A1 Dec. 27, 2018

Related U.S. Application Data

(63) Continuation-in-part of application No. 15/907,042, filed on Feb. 27, 2018, and a continuation-in-part of
(Continued)

(51) Int. Cl.
*G06F 17/16* (2006.01)
*G06F 9/30* (2018.01)
(Continued)

(52) U.S. Cl.
CPC ............ *G06F 17/16* (2013.01); *G06F 7/5443* (2013.01); *G06F 7/78* (2013.01); *G06F 9/30036* (2013.01)

(58) Field of Classification Search
CPC .... G06F 9/30036; G06F 17/16; G06F 7/5443; G06F 7/78
(Continued)

(56) References Cited

U.S. PATENT DOCUMENTS

| 4,897,717 A | 1/1990 | Hamilton et al. |
| 5,099,447 A | 3/1992 | Myszewski |

(Continued)

OTHER PUBLICATIONS

Notification of Transmittal of the International Search Report and the Written Opinion of the International Searching Authority, or the Declaration; PCT/US 2018/020462; dated Aug. 9, 2018, 6 pages.
(Continued)

*Primary Examiner* — Tan V Mai
(74) *Attorney, Agent, or Firm* — Ebby Abraham; Charles A. Brill; Frank D. Cimino

(57) ABSTRACT

An outer product multiplier (GPM) system/method that integrates compute gating and input/output circular column rotation functions to balance time spent in compute and data transfer operations while limiting overall dynamic power dissipation is disclosed. Matrix compute gating (MCG) based on a computation decision matrix (CDM) limits the number of computations required on a per cycle basis to reduce overall matrix compute cycle power dissipation. A circular column rotation vector (CRV) automates input/output data formatting to reduce the number of data transfer operations required to achieve a given matrix computation result. Matrix function operators (MFO) utilizing these features are disclosed and include: matrix-matrix multiplication; matrix-matrix and vector-vector point-wise multiplication, addition, and assignment; matrix-vector multiplication; vector-vector inner product; matrix transpose; matrix row permute; and vector-column permute.

13 Claims, 16 Drawing Sheets

Related U.S. Application Data application No. 15/905,250, filed on Feb. 26, 2018, and a continuation-in-part of application No. 15/900,611, filed on Feb. 20, 2018.

(60) Provisional application No. 62/465,620, filed on Mar. 1, 2017, provisional application No. 62/464,964, filed on Feb. 28, 2017, provisional application No. 62/464,954, filed on Feb. 28, 2017, provisional application No. 62/463,426, filed on Feb. 24, 2017.

(51) Int. Cl.
*G06F 7/78* (2006.01)
*G06F 7/544* (2006.01)

(58) Field of Classification Search
USPC .......................................................... 708/203
See application file for complete search history.

(56) References Cited

U.S. PATENT DOCUMENTS

| | | | |
|---|---|---|---|
| 5,745,793 | A | 4/1998 | Atsatt et al. |
| 5,870,568 | A | 2/1999 | Culkey et al. |
| 5,982,375 | A | 11/1999 | Nelson et al. |
| 8,301,749 | B1 | 10/2012 | Finklestein et al. |
| 9,606,803 | B2 | 3/2017 | Anderson et al. |
| 9,645,974 | B1 | 5/2017 | Patil et al. |
| 10,114,613 | B2 | 10/2018 | Bekas et al. |
| 2002/0191692 | A1 | 12/2002 | Fallon et al. |
| 2004/0136316 | A1 | 7/2004 | Kwak et al. |
| 2009/0292758 | A1 | 11/2009 | Brokenshire et al. |
| 2009/0300091 | A1 | 12/2009 | Brokenshire et al. |
| 2011/0153707 | A1 | 6/2011 | Ginzburg et al. |
| 2012/0011348 | A1 | 1/2012 | Eichenberger et al. |
| 2012/0072917 | A1 | 3/2012 | Boldyrev et al. |
| 2012/0140814 | A1 | 6/2012 | Sole Rojals et al. |
| 2012/0251013 | A1 | 10/2012 | Porikli |
| 2012/0268298 | A1 | 10/2012 | Oh |
| 2013/0262548 | A1 | 10/2013 | Ge et al. |
| 2014/0167987 | A1 | 6/2014 | Pell et al. |
| 2014/0365548 | A1 | 12/2014 | Mortensen |
| 2013/0373158 | | 12/2016 | Ardalan |
| 2017/0139710 | A1 | 5/2017 | Zbiciak |
| 2017/0153890 | A1 | 6/2017 | Anderson et al. |
| 2017/0153959 | A1 | 6/2017 | Zbiciak |
| 2017/0168898 | A1 | 6/2017 | Zbiciak et al. |
| 2017/0249150 | A1 | 8/2017 | Zbiciak et al. |
| 2017/0308381 | A1 | 10/2017 | Zbiciak |
| 2019/0266218 | A1* | 8/2019 | Scott ...................... G06N 3/105 |

OTHER PUBLICATIONS

Notification of Transmittal of the International Search Report and the Written Opinion of the International Searching Authority, or the Declaration; PCT/US 2018/020283; dated Aug. 23, 2018, 8 pages.
Notification of Transmittal of the International Search Report and the Written Opinion of the International Searching Authority, or the Declaration; PCT/US 2018/019746; dated Jan. 31, 2019; 8 pages.
Extended European Search Report; App. Pat. No. 18760733.8-1231/3590048 PCT/US2018020462; dated Feb. 4, 2020; 8 pages.
Utku Aydoinat, et al. "An Open CL(TM) Deep Learning Accelerator on Arria 10", arxiv.org, Cornell University Library, 201 Olin Library, Cornell University Ithaca, NY 14853, Jan. 13, 2017, XP080741254.
Hussain Tassadaq, et al. "PPMC: A Program Pattern Based Mwmory Controller", Mar. 19, 2012, International Conference on Financial Cryptography and Data Security; [Lecture Notes in Computer Science; Lect. Noptes Computer], Springer, Berlin, Heidelberg, pp. 89-101, XP047379471, ISBN: 978-3-642-17318-9.
Chen Zhang et al."Optimizing FPGA-based Accelerator Design for Deep Convolutional Neural Networks", Proceedings of the 2015 ACM/SIGDA International Symposium of Field-Programmable Gate Arrays, FPGA, 15, Feb. 22, 2015, pp. 161-170, XP055265150, New, NY, USA, DOI: 10.1145/2684746.2689060, ISBN:978-45033315-3.

* cited by examiner

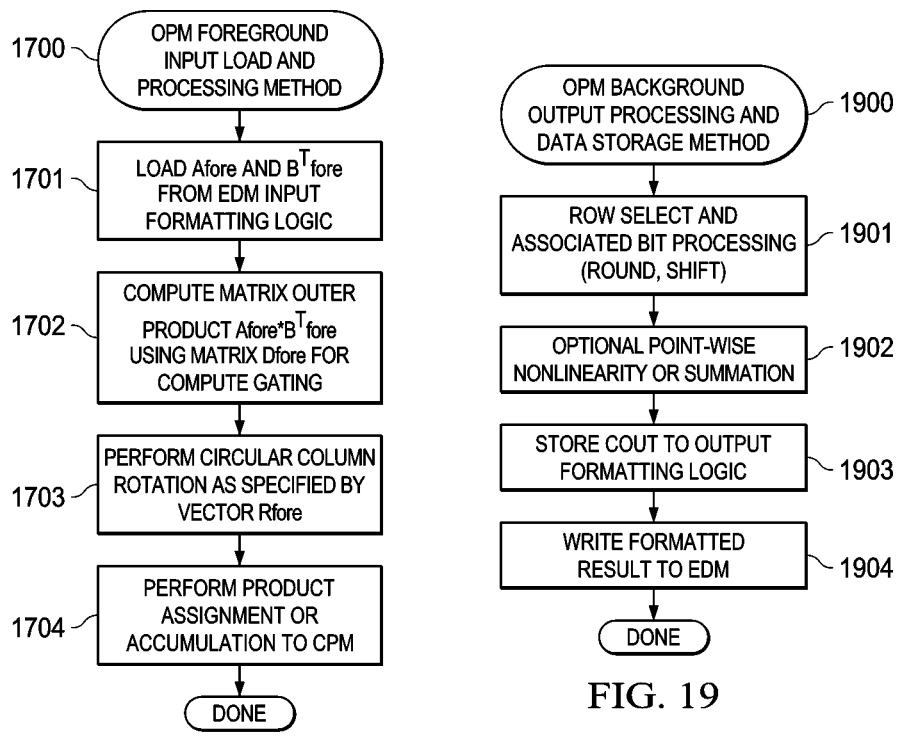
FIG. 17
FIG. 19
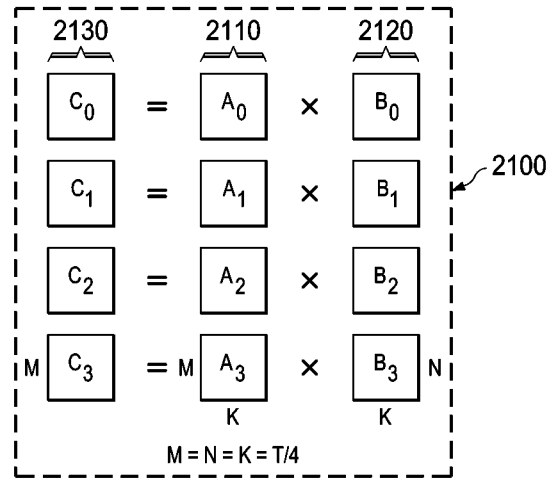
FIG. 21

US 10,810,281 B2

OUTER PRODUCT MULTIPLER SYSTEM AND METHOD

CROSS REFERENCE TO RELATED APPLICATIONS

Utility Patent Applications

This application is a continuation-in-part (CIP) of U.S. application Ser. No. 15/900,611 filed Feb. 20, 2018, which claims the benefit of U.S. Provisional Application No. 62/465,620, filed Mar. 1, 2017, U.S. Provisional Application No. 62/464,954, filed Feb. 28, 2017, U.S. Provisional Application No. 62/464,964, filed Feb. 28, 2017, and U.S. Provisional Application No. 62/463,426, filed Feb. 24, 2017.

This application is a continuation-in-part (CIP) of U.S. application Ser. No. 15/905,250 filed Feb. 26, 2018, which claims the benefit of U.S. Provisional Application No. 62/465,620, filed Mar. 1, 2017, U.S. Provisional Application No. 62/464,954, filed Feb. 28, 2017, and U.S. Provisional Application No. 62/464,964 filed Feb. 28, 2017.

This application is a continuation-in-part (CIP) of U.S. application Ser. No. 15/907,042 filed Feb. 27, 2018, which claims the benefit of U.S. Provisional Application No. 62/465,620, filed Mar. 1, 2017, U.S. Provisional Application No. 62/464,954, filed Feb. 28, 2017, and U.S. Provisional Application No. 62/464,964, filed Feb. 28, 2017.

TECHNICAL FIELD

The present disclosure relates to digital hardware.

SUMMARY

This disclosure relates to an outer product multiplier (OPM) system and method that configure to implement a variety of low-level matrix-matrix and matrix-vector mathematical functions in a performance and power efficient manner.

In at least one example, an outer product multiplier (OPM) system includes an A-multiplier-matrix register (AMM) having at least one column of M rows; a B-multiplicand-matrix register (BMM) having at least one row of N columns; a C-product-matrix register (CPM) organized as a matrix having M rows and N columns, all three that are selectively coupled to an external data memory (EDM). A hierarchical multiplication array logic (HMA) is configured to calculate a simultaneous M×N outer product matrix computation of a column of the A-multiplier-matrix register and a row of the B-multiplicand-matrix register and produce a resulting M×N matrix product result (MPR). Additionally, the hierarchical multiplication array logic gates execution of said simultaneous M×N outer product matrix computation based on computation gating data contained in a computation decision matrix register (CDM), and routes the matrix product result to the C-product-matrix register based on shifting data contained in said circular column rotation vector register (CRV).

In at least one example, an outer product multiplier (OPM) method includes loading a A-multiplier-matrix (AMM) and a B-multiplicand-matrix (BMM) from an external data memory (EDM), with a hierarchical multiplication array logic (HMA), performing matrix outer product (MOP) computations of the A-multiplier-matrix with the B-multiplicand-matrix, the matrix outer product computations can be gated by the contents of a computation decision matrix register (CDM) to produce a matrix gated computation (MGC), the matrix gated computation is shifted based on the contents of a circular column rotation vector register (CRV) to produce a matrix shifted computation (MSC) result that is assigned or accumulated to a C-product-matrix register (CPM).

BRIEF DESCRIPTION OF THE DRAWINGS

FIG. 17 illustrates a flowchart depicting an embodiment of foreground input load and processing method embodiment;

FIG. 19 illustrates a flowchart depicting an embodiment of background output processing and data storage method embodiment;

FIG. 21 illustrates an exemplary block-based matrix multiplication example depicting a desired block matrix multiplication operation;

DETAILED DESCRIPTION

Figure 1:
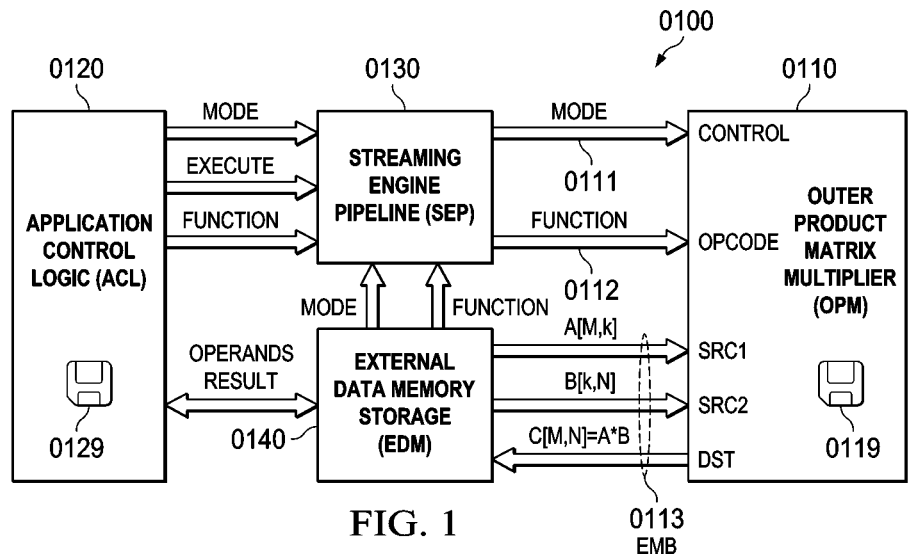
FIG. 1 illustrates a system block diagram of an embodiment of the present disclosure.

While this disclosure is susceptible of embodiment in many different forms, there is shown in the drawings and will herein be described in detailed preferred embodiment of the disclosure with the understanding that the present disclosure is to be considered as an exemplification of the principles of the disclosure and is not intended to limit the broad aspect of the disclosure to the embodiment illustrated.

The numerous innovative teachings of the present application will be described with particular reference to the presently preferred embodiment, wherein these innovative teachings are advantageously applied to the particular problems of an outer product computation. However, it should be understood that this embodiment is only one example of the many advantageous uses of the innovative teachings herein. In general, statements made in the specification of the present application do not necessarily limit any of the various embodiments. Moreover, some statements may apply to some inventive features but not to others.

Example embodiments relate to the generation of a matrix multiplication product and/or a result of a matrix multiply and add operation (or multiply-accumulate operation) having the form C=A*B+D. Within this document the variables in this function will be equivalently identified as "A" or the A-multiplier-matrix (AMM), "B" or the B-multiplicand-matrix (BMM), "C" or the C-product-matrix (CPM) (or alternatively, the multiply and add result matrix (or multiply-accumulate operation)), and "D" or the B-summation-matrix (DSM).

References to matrices in the form XXX[row,col] may refer to all column elements on a given row by XXX[row,:] and all row elements on a given column by XXX[:,col]. Ranges of row/column may be represented by XXX[r1:r2, c1:c2] and represent the submatrix of XXX from row r1 to r2 and column c1 to c2.

In some preferred embodiments multiplication operations of the form C=A*B or C=A*B+D may be configured such that the A-multiplier-matrix (AMM) is a vector having a single row and a fixed length in bits that is divided into equal-sized individual datum. Thus, the term "matrix" includes single row or single column vectors.

For example, a system configured with fixed 512-bit external memory data busses may be configured with the AMM having 512 bits that are divided into 64 8-bit data blocks, 32 16-bit data blocks, 16 32-bit data blocks, 8 64-bit data blocks, 4 128-bit data blocks, or 2 256-bit data blocks depending on the dynamic reconfiguration of the matrix multiplication system.

The numerical matrix dimensions as provided in this disclosure are only exemplary and do not limit the scope of the embodiments. Additionally, while some embodiments may implement matrix multiplication and/or accumulation using square matrices (having an equal number of rows and columns), this is not a limitation of the claimed invention. Furthermore, while the dimensionality of the depicted matrices is of order two (two dimensional), this disclosure is not limited to matrices having a two dimensional configuration and contemplates higher order matrices having dimensionality greater than two (e.g. CPM[x,y,z], CPM[w,x,y,z], etc.) being supported.

Example embodiments are herein described as having an exemplary data bus width of 512 bits. This exemplary data bus width is not a limitation on the disclosure and as a wide variety of data bus widths are contemplated in a variety of application contexts. However, it should be noted that in many embodiments a data bus width corresponding to a power-of-two data bits is considered optimal.

The phrases "natural number", "natural numbers", "counting number", and "counting numbers", and multiples thereof will herein refer to the mathematical set of positive integers greater than zero (1, 2, 3, . . . ).

The phrases "polygonal number," "polygonal numbers," and multiples thereof may refer to numbers that can be represented as dots that are arranged in the shape of a regular polygon. As used herein, these phrases may refer to the mathematical set of positive integers greater than two (3, 4, 5, . . . ). Polygonal numbers, as used herein, may alternatively refer to the set of natural numbers with the integer values of unity (1) and two (2) removed.

The phrases "bipolygonal number," "bipolygonal numbers," and multiples thereof may refer to the mathematical set of positive integers greater than unity (2, 3, 4, . . . ). The mathematical set may include the combined set of polygonal integers (3, 4, 5, . . . ) and the positive integer 2. Bipolygonal numbers, as used herein, may alternatively refer to the set of natural numbers with the integer value of unity (1) removed.

The phrases "power-of-two," "powers-of-two," and multiples thereof may refer to the mathematical set of integers of the form where N is a natural number as defined above.

The phrases "bipolygonal-power-of-two," "bipolygonal-powers-of-two," and multiples thereof may refer to the mathematical set of integers of the form $2^N$ where N is a bipolygonal number.

Example multiplication/accumulation operations executed by the outer product matrix multiplier (OPM) may operate on a variety of data types as present on the various external and internal data busses. In example embodiments, the mode/control and/or function/opcode information provided to the OPM may control the interpretation of data retrieved from the EMB and operated on by the OPM. Within this context, one or more of the following operand data types may be supported by the OPM:

4-bit unsigned integer;
4-bit signed integer;
8-hit unsigned integer;

8-bit signed integer;
16-bit unsigned integer;
16-bit signed integer;
32-bit unsigned integer;
32-bit signed integer;
64-bit unsigned integer; and
64-bit signed integer.

While the accumulation function within the OPM may incorporate a variety of data types, one or more of the following accumulation data types may be supported by the OPM:

16-bit unsigned integer for 4-bit unsigned operands;
16-bit signed integer for 4-bit signed or mixed signed/unsigned operands;
32-bit unsigned integer for 8-bit unsigned operands;
32-bit signed integer for 8-bit signed or mixed signed/unsigned operands;
64-bit unsigned integer for 16-bit unsigned operands;
64-bit signed integer for 16-bit signed or mixed signed/unsigned operands;
128-bit unsigned integer for 32-bit unsigned operands;
128-bit signed integer for 32-bit signed or mixed signed/unsigned operands;
256-bit unsigned integer for 64-bit unsigned operands; and
256-bit signed integer for 64-bit signed or mixed signed/unsigned operands.

While output data of the OPM may incorporate a variety of data types, one or more of the following output data types may be supported by the OPM:

4-bit unsigned integer;
4-bit signed integer;
8-bit unsigned integer;
8-bit signed integer;
16-bit unsigned integer;
16-bit signed integer;
32-bit unsigned integer;
32-bit signed integer;
64-bit unsigned integer;
64-bit signed integer;
128-bit unsigned integer;
128-bit signed integer;
256-bit unsigned integer; and
256-bit signed integer.

Other data types are possible using the techniques of this disclosure.

System Overview (0100)

A typical application context overview of the present disclosure is generally depicted in FIG. 1 (0100) wherein an outer product matrix multiplier (OPM) (0110) is interfaced to application control logic (ACL) (0120) via an optional streaming engine pipeline (SEP) (0130) and external data memory storage (EDM) (0140). In situations where the optional streaming engine pipeline (SEP) (0130) is absent, data may be transferred to/from the OPM (0110) via the use of hardware registers accessible by the ACL (0120) and the OPM (0110). The application control logic (ACL) (0120) may, in some examples, represent a central processing unit (CPU) to which the OPM (0110) represents a matrix multiplication accelerator (MMA) that may integrate tightly or loosely into the operation of the ACL (0120).

The SEP (0130) represents a hardware interface between the ACL (0120) and OPM (0110) that allows OPM (0110) mode/control (0111) and function/opcode (0112) configuration information to be streamed to the OPM (0110) so as to allow continuous operation of the OPM (0110) without the need for further intervention by the ACL (0120). The SEP (0130) may also represent a hardware interface between the EDM (0140) and OPM (0110) that allows OPM (0110) mode/control (0111) and function/opcode (0112) configuration information to be streamed to the EDM (0140) so as to allow continuous operation of the OPM (0110) without the need for further intervention by the ACL (0120) after streaming is initially executed by the ACL (0120). The OPM mode/control (0111) bus defines how data operated on by the OPM (0110) is to be interpreted and/or formatted and the OPM function/opcode (0112) bus defines what mathematical operations are to be performed on the data (AMM, BMM, etc.) presented to the OPM (0110). While the external data memory storage (EDM) (0140) may be a slower form of random access memory (RAM) such as dynamic random access memory (DRAM), other examples may use a faster memory and/or storage system. Typically, but not necessarily, memory contained within the OPM (0110) has faster read/write/access timing than that of the EMD (0140).

The OPM (0110) interfaces to the EMD (0140) via an external memory bus (EMB) (0113) that allows source matrix operands (SRC1, SRC2) to be loaded via one or more data busses (A[M,k]; B[k,N]) and the results (DST) of the matrix multiplication operation (C[M,N]) stored via a common or separate data bus. In typical application contexts, the external memory bus (EMB) (0113) may comprise a single data bus having a data width that is a multiple of the individual datum width associated with the A, B, and C matrices. For example, the EMB (0113) data width might be set at 512 bits with the matrix datum width being set to 8, 16, 32, or 64 bit depending on the mode Control (0111) configuration information that determine the interpretation of data bits within the EMB (0113).

Example embodiments may permit matrices having the form X[rows, cols] to be outer product multiplied together such that C[M,N]=A[M,0]*B[0,N] where M and N are natural numbers. As indicated, the OPM (0110) and/or ACL (0120) may incorporate a tangible non-transitory computer readable medium (0119, 0129) that contains machine instructions, such as, a (portable or internally installed) hard drive disc, a flash drive, a compact disc, a DVD, a zip drive, a floppy disc, optical medium, magnetic medium, or any other number of possible drives or discs, that are executed by the internal logic of the OPM (0110) and ACL (0120) respectively.

Application Contexts

Example embodiments may be advantageously applied to several application areas having both low and high level compute requirements that reduce to matrix operations at a variety of precision levels. These may include but are not limited to audio, speech, machine controls, industrial automation, radar, ultrasonic sensing, vision, video, and image processing applications.

To efficiently address these computations and other typical application contexts an example OPM according to this disclosure may, in some cases, target and/or improve the following system performance characteristics:

The $T^3$-compute—(compute=multiply accumulate)—to $3*T^2$-data-movement ratio of matrix-matrix multiplication is a performance factor for efficient system operation.

As the matrix size T×T is increased the compute-to-data-movement ratio is correspondingly increased and with it an increased potential for higher system hardware efficiency. Note that within the context of a system-on-a-chip (SOC) implementation, the dynamic power is proportional to the system voltage squared multiplied by the system clock frequency times the number of data transfers performed per second. Thus, minimizing data transfers (especially to slower EDM such as DRAM) significantly reduces overall system power consumption.

Put another way, the power required for data movement is a loss term with respect to efficiency so T is selected as large as possible such that there is as much computation as possible performed for each piece of data transferred to/from EDM.

This disclosure describes how to enhance an outer product based matrix multiplication hardware accelerator to efficiently enable a wide variety of different full-size and block-based low level operations in a single hardware context such as matrix-matrix multiplication, matrix-matrix point-wise multiplication, matrix-matrix addition, matrix-vector multiplication, vector-vector inner product, matrix transpose, matrix row permute, vector column permute, and matrix assignment. With appropriate input and output formatting and combinations of low level algorithms a wide variety of more complex matrix functions can also be implemented using the disclosed techniques.

Tightly Coupled Application Context (0200)

Figure 2:
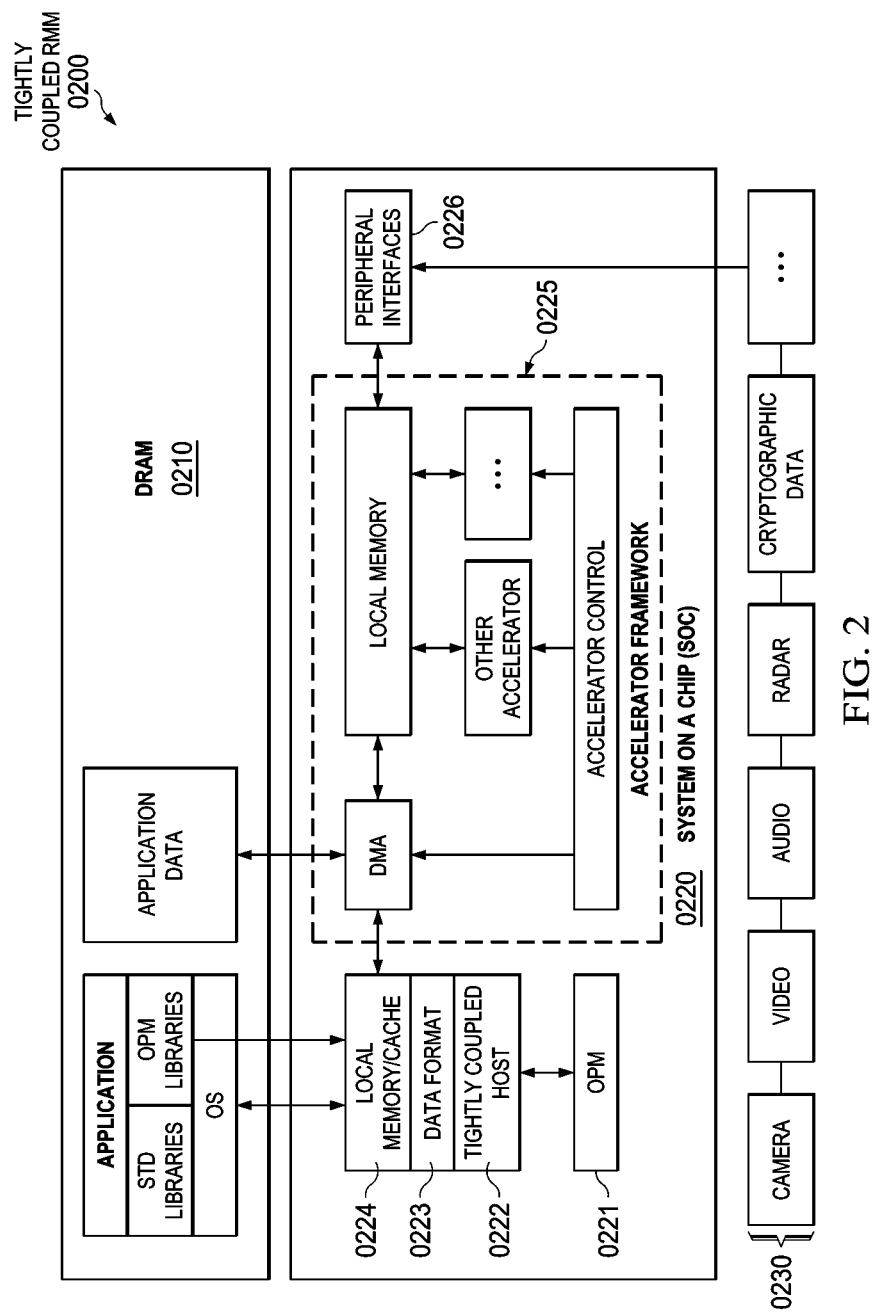
FIG. 2 illustrates a system block diagram of an embodiment of the present disclosure as implemented in a tightly coupled outer product matrix multiplier (OPM) application context.

Example embodiments may be implemented in a variety of application contexts with an example of a tightly coupled application context generally presented in FIG. 2 (0200) wherein DRAM memory (0210) interfaces with a system-on-a-chip (SOC) (0220) incorporating the tightly coupled DPM (0221) that interfaces to a host CPU (0222), formatting hardware (0223), and local memory (0224). This tightly coupled approach may be integrated within an accelerator framework (0225) incorporating other application specific accelerators in combination that support processing of data from a variety of peripheral interfaces (0226) coupled to hardware devices (0230) such as cameras, imaging data, video data, streaming video, audio data, streaming audio, ultrasonic data, ultrasonic sensors, radar data, radar, cryptographic data, encrypted data sources, and other applications requiring high performance multiplication and/or accumulation operations.

Loosely Coupled Application Context (0300)

Figure 3:
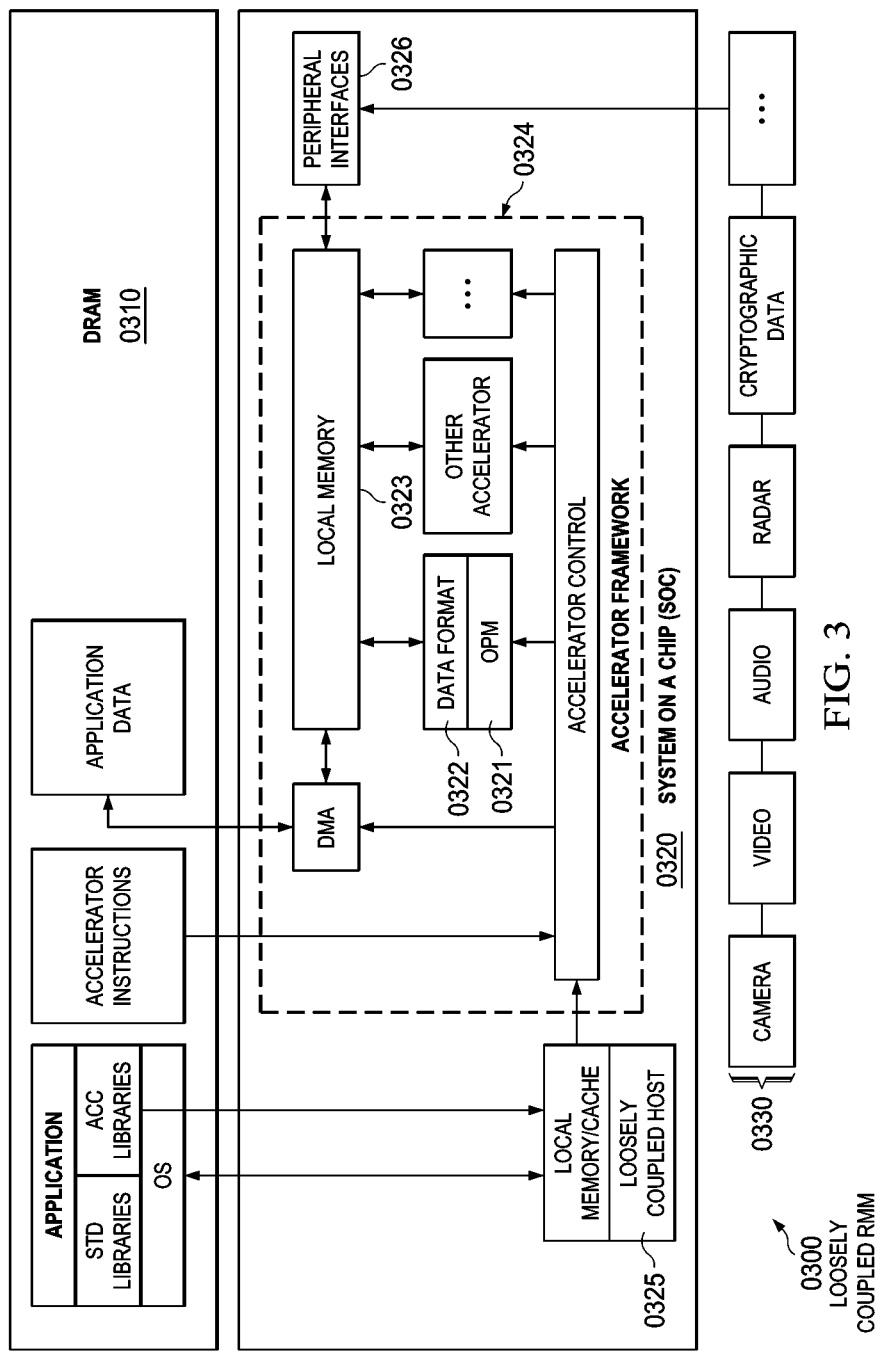
FIG. 3 illustrates a system block diagram of an embodiment of the present disclosure as implemented in a loosely coupled outer product matrix multiplier (OPM) application context.

Example embodiments may be implemented in a variety of application contexts with an example of a loosely coupled application context generally presented in FIG. 3 (0300) wherein DRAM memory (0310) interfaces with a system-on-a-chip (SOC) (0320) incorporating the loosely coupled OPM (0321) that interfaces to formatting hardware (0322) and local memory (0323) within an accelerator framework (0324) that interfaces to a loosely coupled host CPU (0325). The accelerator framework (0324) may incorporate other application specific accelerators in combination with the OPM (0321) that support processing of data from a variety of peripheral interfaces (0326) coupled to hardware devices (0330) such as cameras, imaging data, video data, streaming video, audio data, streaming audio, ultrasonic data, ultrasonic sensors, radar data, radar, cryptographic data, encrypted data sources, and other applications requiring high performance multiplication and/or accumulation operations.

Preferred Exemplary Hardware Interface (0400)

Figure 4:
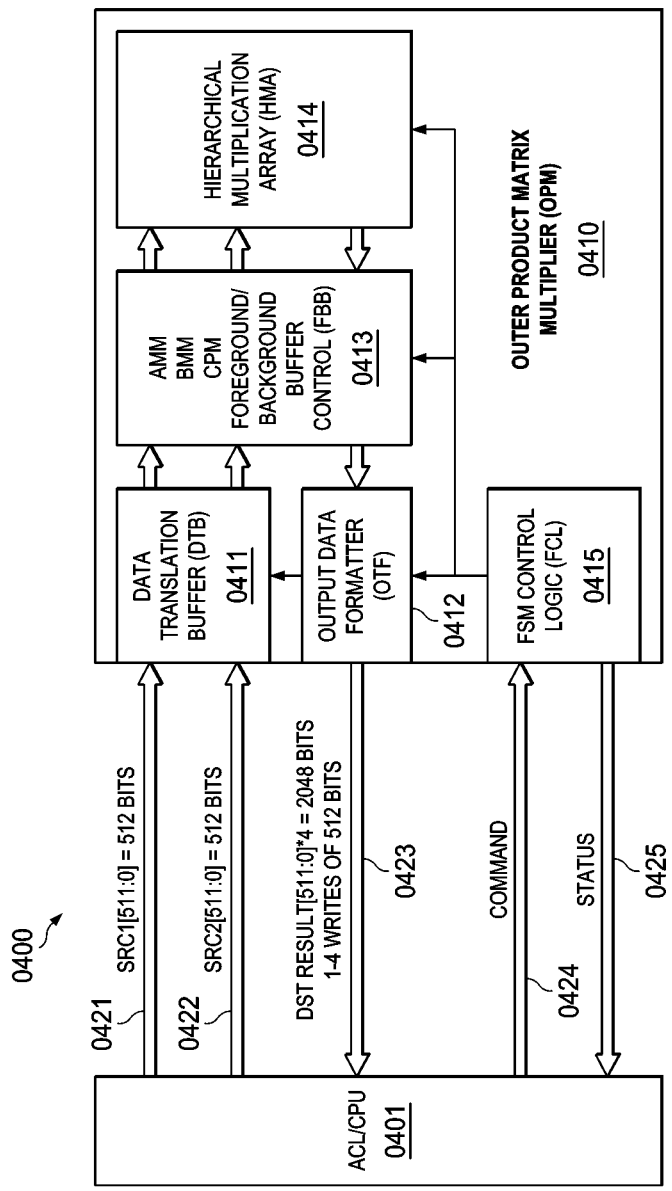
FIG. 4 illustrates a system block diagram of an embodiment of the present disclosure as interfaced to a typical CPU using a 512-bit external memory bus (EMB)

While example embodiments may be interfaced to external application control logic (ACL) in a wide variety of ways, one preferred exemplary hardware interface is generally depicted in FIG. 4 (0400) wherein a general purpose CPU (0401) (which may be a portion of a highly integrated system-on-a-chip (SOC)) interfaces with a OPM (0410) via 512-bit SRC1 (0421) and SRC2 (0422) data busses and which returns product results via a 512-bit DST RESULTS data bus (0423) in one to four write cycles (for a total of 512-2048 bits). While a bus width of 512 bits is described for exemplary purposes, the bus width for the SRC1 data bus (0421), SRC2 data bus (0422), and the DST RESULTS bus (0423) may take on other values. For example the DST RESULTS bus (0423) may be wider than that of the SRC1 (0421) and SRC2 (0422) data busses. While separate data busses depict these busses, in some preferred embodiments these busses may be in fact a singular external memory data bus (EMB) connecting the OPM to RAM that is physically separate from the OPM. It should be noted that generally speaking if the SRC1 (AMM) multiplier and SRC2 (BMM) multiplicand have a scalar data width of W data bits, the resulting scalar data width of the multiply/accumulated DST (CPM) result may be 4*W data bits in some embodiments. However, the number of data bits written back to the resulting DST or EMB data busses may be selected as W, 2*W, or 4*W in many preferred embodiments.

In addition to these data busses, the OPM (0410) is provided with COMMAND lines (0424) (which may include model/control information as well as function/op-code instructions and or operation initiation control lines) from the CPU (0401). The OPM (0410) may also provide to the CPU (0401) a number of STATUS lines (0425) that indicate the status of the OPM (0410), error conditions, operation completion status indicators, and timing/sequencing control lines. All of these busses (0421, 0422, 0423) and COMMAND (0424)/STATUS (0425) interfaces may optionally incorporate parity and/or error correcting code (ECC, SECDED) functionality to ensure data integrity between the CPU (0401) and the OPM (0410).

Within the OPM (0410) a data translation buffer (DTB) (0411) permits data from the SRC1 (0421), SRC2 (0422) (or equivalent singular EMB) busses to be transformed via a lookup table (LUT) or other function transform before being used internally within the OPM (0410). Similarly, an output data formatter (OTF) (0412) permits results data calculated by the OPM (0410) to be formatted and/or function transformed before being presented to the DST RESULTS (0423) data bus (or equivalently the singular EMB bus). Incoming data translated by the DTB (0411) is stored within registers coordinated by a foreground/background buffer control (FBB) (0413) that provides for data storage for the AMM, BMM, and CPM data that is operated on by a hierarchical multiplication array (HMA) (0414) to produce a CPM-fore outer product result from the multiplication of AMM-fore multiplier and BMM-fore multiplicand registers maintained by the FBB (0413). While computations within the HMA (0414) occur, data transfers can occur in the background using AMM back, BMM-back, and CPM-back register sets maintained by the FBB (0413) to overlap compute and data transfer cycles within the OPM (0410). Finite state machine (FSM) control logic (0415) coordinates the operation of the major subsystems within the OPM (0410) in response to COMMAND (0424) inputs from the ACL/CPU (0401) and produces a variety of STATUS (0425) responses that may be integrated by the ACL/CPU (0401).

OPM System Architecture and Data Flow (0500)-(0600)

Figure 5:
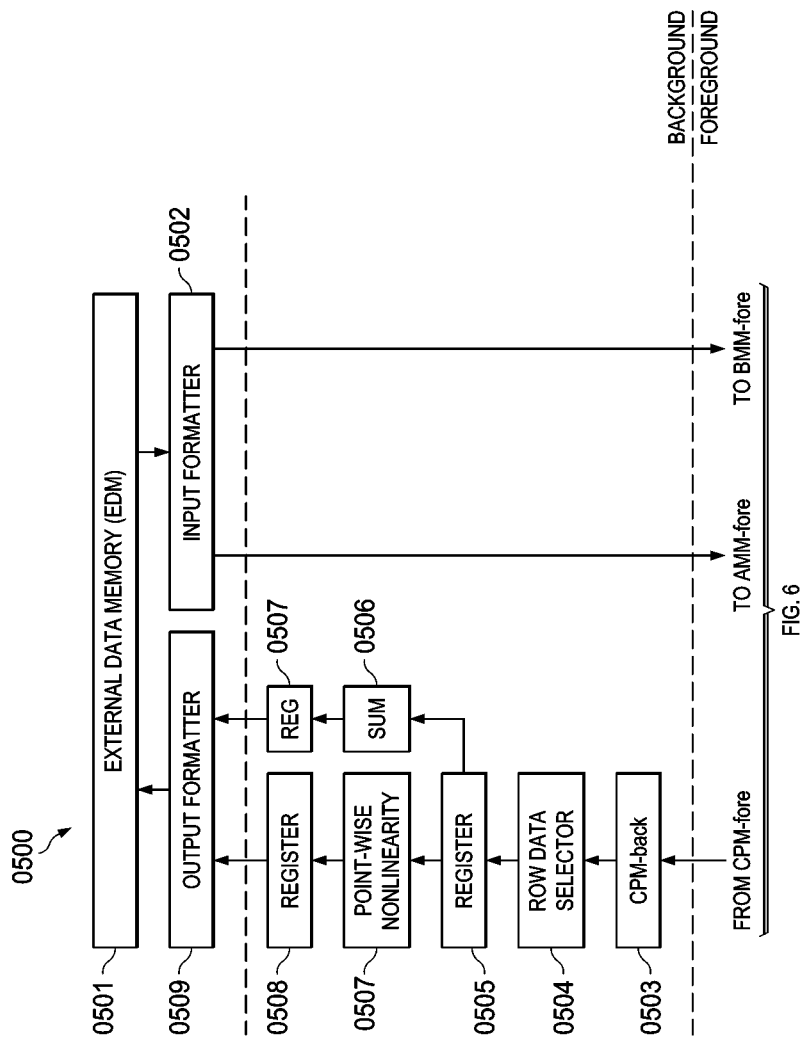
FIG. 5 illustrates a block diagram detailing an embodiment of system architecture and data flow (page 1 of 2)
Figure 6:
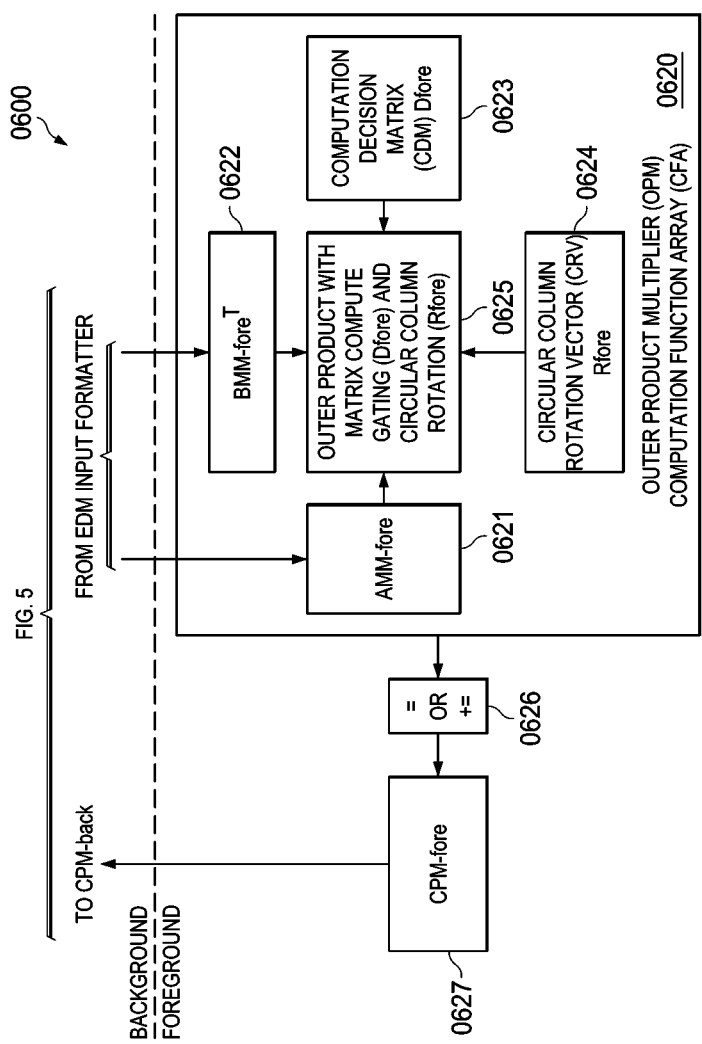
FIG. 6 illustrates a block diagram detailing an embodiment of system architecture and data flow (page 2 of 2)

FIG. 5 (0500) and FIG. 6 (0600) generally depict a block diagram of the general data flow architecture of a preferred exemplary OPM embodiment. The depicted system is generally divided between operations that occur in the background (FIG. 5 (0500)) and those that occur in the foreground (FIG. 6 (0600)).

FIG. 5 (0500) generally depicts OPM background data processing. Generally, OPM operand data is read from the external data memory (EDM) (0501) and processed by an input formatter (0502) that is responsible for data transformations, data table lookups, and other input formatting operations. The formatted data then transfers to the AMM-fore (0621) and BMM-fore (0622) foreground storage elements depicted in FIG. 6 (0600), After OPM matrix computations are completed (as detailed in FIG. 6 (0600), the resulting CPM-fore data is transferred to a CPM-back (0503) register or data pointers associated with CPM-fore and CPM-back are swapped so that the CPM-back (0503) data points to the previously computed CPM-fore product. A data selector (0504) selects data from the CPM-back (0503) result and stores it in the register (0505). This registered data (0505) may be applied to either a scalar summation output processing pipeline (0506, 0507, 0509, 0501) or a vector point-wise non-linearity output processing pipeline (0507, 0508, 0509, 0501) depending on function/operation or mode/control instructions given to the OPM by the ACL. Both the scalar summation output processing pipeline (0506, 0507, 0509, 0501) and vector point-wise non-linearity output processing pipeline (0507, 0508, 0509, 0501) make use of an output formatting (0509) circuit that formats output data into a desired result for storage in EDM (0501). The vector point-wise non-linearity output processing pipeline (0507, 0508, 0509, 0501) may either implement a point-wise non-linearity or provide for direct vector bypass operation where no data transformation is performed on the output data.

FIG. 6 (0600) generally depicts OPM background data processing. The OPM formatted data read from the EDM (0501) and presented to the input formatter (0502) is placed in the AMM-fore (0621) and BMM-fore (0622) foreground storage elements depicted in FIG. 6 (0600). The outer product multiplier (OPM) computation function array (CFA) (0620) comprises an additional computation decision matrix (CDM) (Dfore) (0623) that gates operation of multiply/accumulate operations within the OPM central outer product computation module (0625). The CFA (0620) also incorporates a circular column rotation vector (CRV) (Rfore) (0624) that positions data within computation module (0625) for processing. This CRV (0624) eliminates the need for additional data movement between the EDM and LDM to properly position data within the CFA (0620) for outer product calculation processing. Once the outer product is computed by the computation module (0625), the result is either transferred ($C=a*b^T$) or sum-transferred ($C+=a*b^T$) (0626) to the CPM-fore (0627) storage registers and either transferred or swapped with the CPM-back (0503) storage element on alternate cycles of foreground/background processing.

OPM Per Cycle Method Operation (0700)-(0800)

Figure 7:
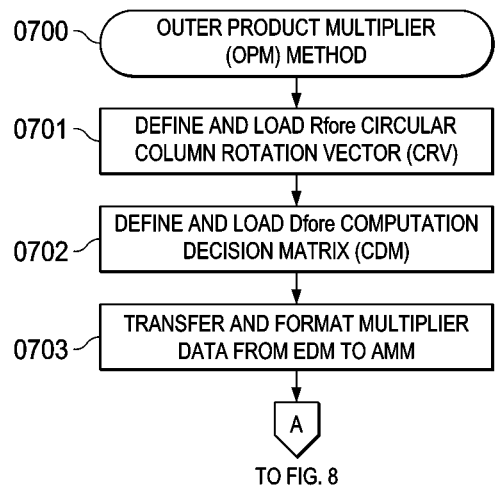
FIG. 7 illustrates a flowchart depicting an embodiment of per cycle operation method embodiment (page 1 of 2)
Figure 8:
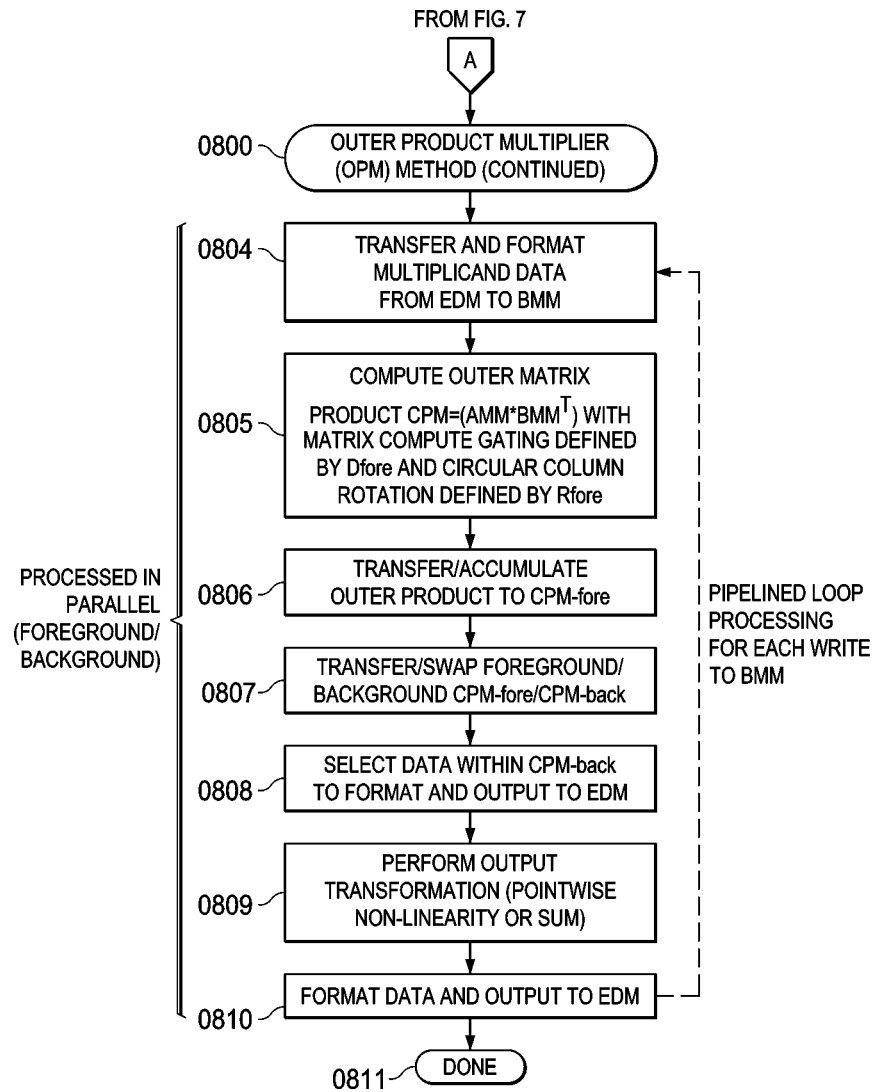
FIG. 8 illustrates a flowchart depicting an embodiment of per cycle operation method embodiment (page 2 of 2)

As generally depicted in FIG. 7 (0700) FIG. 8 (0800) and consistent with the system block diagrams of FIG. 5 (0500) FIG. 6 (0600), the present disclosed method may be broadly generalized as an outer product multiplier (OPM) method comprising (1) Define and load Rfore circular column rotation vector (CRV) (0701);
(2) Define and load Dfore computation decision matrix (CDM) (0702);
(3) Transfer and format multiplier data from EDM to AMM (0703);
(4) Transfer and format multiplicand data from EDM to BMM (0804);
(5) Compute outer matrix product CPM=(AMM*BMM$^T$) with matrix compute gating defined by Dfore and circular column rotation defined by Rfore (0805);
(6) Transfer/accumulate outer product to CPM-fore (0806);
(7) Transfer/swap foreground/background CPM-fore/CPM-back (0807);
(8) Select data within CPM-back to format and output to the EDM (0808);
(9) Perform output transformation (pointwise non-linearity or sum) on selected CPM data (0809); and
(10) Format selected data and output to the EDM (0810), A completion (0811) of the disclosed method can be utilized to initialize another method or complete all of the desired steps. In one version, these steps would be performed in a pipelined implementation allowing a group or all of the steps to be performed in parallel. This general method may be modified heavily depending on a number of factors, with rearrangement and/or addition/deletion of steps anticipated by the scope of the present disclosure. Integration of this and other preferred exemplary embodiment methods in conjunction with a variety of preferred exemplary embodiment systems described herein is within the scope of this disclosure. Details of this OPM method are discussed below.

Per Cycle Foreground Input Load and Processing

OPM foreground input loading and processing generally involves the following steps:

(1) Load $a_{fore}$ and $b^T_{fore}$ vectors from input formatting;
(2) Compute outer product $a_{fore}*b^T_{fore}$ using matrix $D_{fore}$ for compute gating in the following two steps:
(3) If $D_{fore}(m, n)=1$ then $C_{pipe}(m, n)=a_{fore}(m)*b^T_{fore}(n)$; or
(4) If $D_{fore}(m, n)=0$ then $C_{pipe}(m, n)=0$
(5) Perform circular column rotation as specified by vector $R_{fore}$, and update $C_{pipe}$ with the circularly column rotated $C_{pipe}$: $C_{pipe}(m, n)=C_{pipe}((m-R_{fore}(n))$ mod T, n);
(6) Perform assignment or accumulation (one of the following two steps):
(7) Assignment (=): $C_{fore}=C_{pipe}$; or
(8) Accumulation (+=) (updating the previous $C_{fore}$, with a new $C_{fore}$): $C_{fore}=C_{pipe}+C_{fore}$.

Per Cycle Background Output Processing and Store

OPM background output processing and store generally involves the following steps:

(1) Row select and associated bit processing (round, shift). $c_{out}$=bit processing($C_{back}(m, :)$);
(2) Optional point-wise nonlinearity or sum as executed on one of the following two steps:
(3) Point-wise nonlinearity: $c_{out}$=nonlinearity($c_{out}$); or
(4) Sum (vector summation): $c_{out}(0)$=sum($c_{out}$);
(5) Store $c_{out}$ to output formatter.

General Comments on Foreground/Background Processing

It should be noted that the matrix size can scale with precision (consider a T×T matrix and b bit data) and keep input output bandwidth constant while reusing multiplier hardware (scaling to s*b bits reduces the matrix size to (T/s)×(T/s)). This is especially useful for supporting multiple precisions of fixed-point data.

Additionally, an extra low latency output to input path can be added to improve the performance of sequential operations (where the output of one operation is the input of the next).

Finally, the data movement and computations can all be pipelined to trade latency for other implementation considerations

Generalized Outer Product Matrix Multiplication (0900)-(1200)

Figures 9, 10:
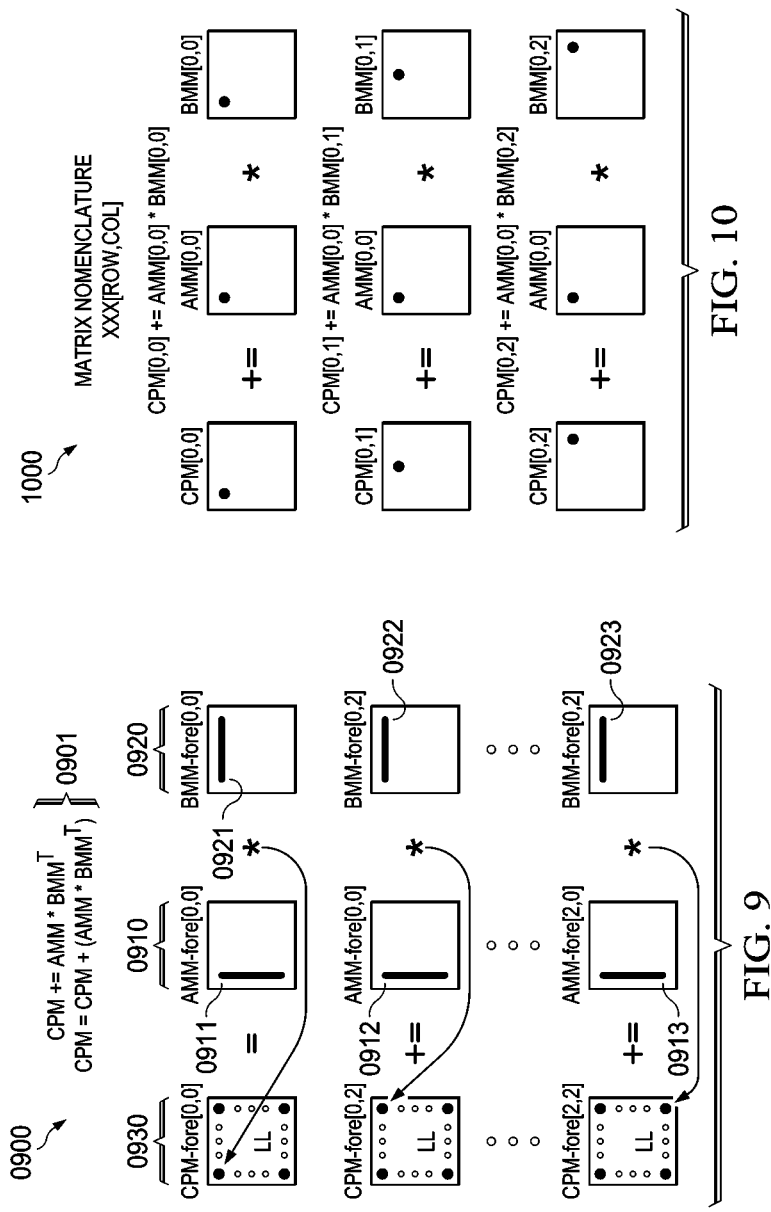
FIG. 9 illustrates a generalized outer product matrix multiplication/accumulation operation.
FIG. 10 illustrates detailed computations of a typical outer product matrix multiplication accumulation operation for row 0 of a 3×3 matrix.

For some initial value of C[i,j], example embodiments may implement a matrix multiplier/accumulator function as generally depicted in FIG. 9 (0900). In some embodiments, the initial value for C[i,j] is a predefined initial value. Here the A-multiplier-matrix (AMM) (may be implemented as a column vector herein), B-multiplicand-matrix (BMM) (may be implemented as a row vector herein), and C-product-matrix (CPM) (having AMM rows and BMM columns) are related by the following multiplication/accumulation formulas:

The outer products of 2 vectors A and $B^T$ is a full matrix. As the various vectors are processed, all of the elements of a full matrix C are updated.

$$C=A(:,0)*B(0,:) \quad (1)$$

$$C\mathrel{+}=A(:,k)*B(k,:), k=1, \ldots, K-1 \quad (2)$$

A general depiction of this multiplication/accumulation process (0901) is depicted in FIG. 9 (0900), wherein individual row elements (0911, 0912, 0913) of the AMM matrix/vector (0910) are multiplied by individual column elements (0921, 0922, 0923) of the BMM matrix (0920) and summed and/or accumulated to individual elements of the CPM matrix (0930) This multiplication can also be performed in parallel, or in a pipelined configuration.

In variants of the present disclosure, the AMM matrix is configured as a single static row vector and multiplied by a column of a locally stored BMM matrix to produce an N×M array of multiplier products that are summed individually to corresponding elements of the CPM matrix. In many of the disclosed embodiments the number of rows (N) in AMM equals the number of columns (M) in BMM to produce a square matrix product CPM of dimensions T×T where T=M=N.

The AMM vector in this instance may be reloaded for each row contribution of the BMM that is to be calculated and summed to the CPM result for multi-row BMM matrices. Alternatively, the AMM vector may be implemented using a bi-phase foreground/background methodology that enables foreground computation of the matrix product while the next vector row of the AMM matrix is loaded in parallel with the matrix multiplication operation. After the computation is complete (during which time new AMM data has been loaded), foreground and background pointers to AMM register data are swapped and a new calculation may proceed using newly loaded AMM data.

Figures 11, 12:
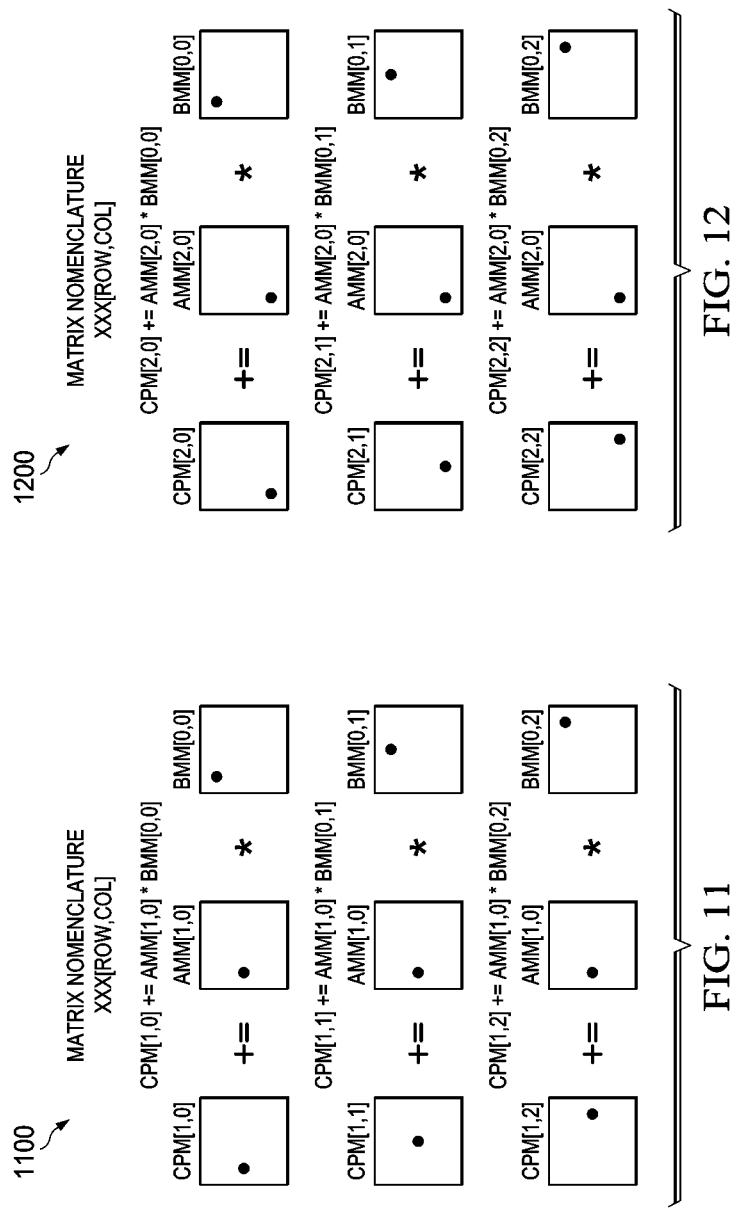
FIG. 11 illustrates detailed computations of a typical outer product matrix multiplication/accumulation operation for row 1 of a 3×3 matrix.
FIG. 12 illustrates detailed computations of a typical outer product matrix multiplication accumulation operation for row 2 of a 3×3 matrix.

FIG. 10 (1000)-FIG. 12 (1200) provide some detail on a typical outer product multiplication/accumulation operation involving a 3×3 matrix and include the arithmetic operations executed during the calculation of each of row 0 (FIG. 10 (1000)), row 1 (FIG. 11 (1100)), and row 2 (FIG. 12 (1200)) of the CPM matrix. This multiplication can also be performed in parallel, or in a pipelined configuration.

Foreground/Background Execution/Transfer (1300)-(1600)

Figure 13:
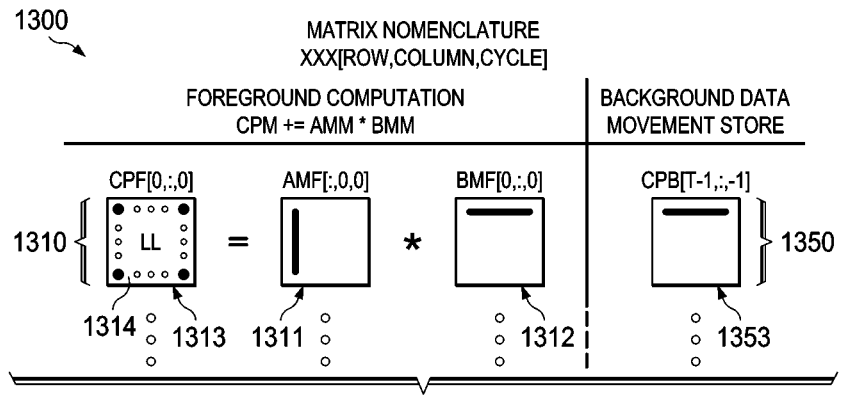
FIG. 13 illustrates an exemplary foreground/background execution/transfer STAGE 0 initial timing diagram depicting a preferred exemplary embodiment in which the OPM may be pipelined and overlapped such that a multiplication accumulation compute cycle may be overlapped with a data transfer between a local memory bus (LMB) and an external memory bus (EMB)
Figure 14:
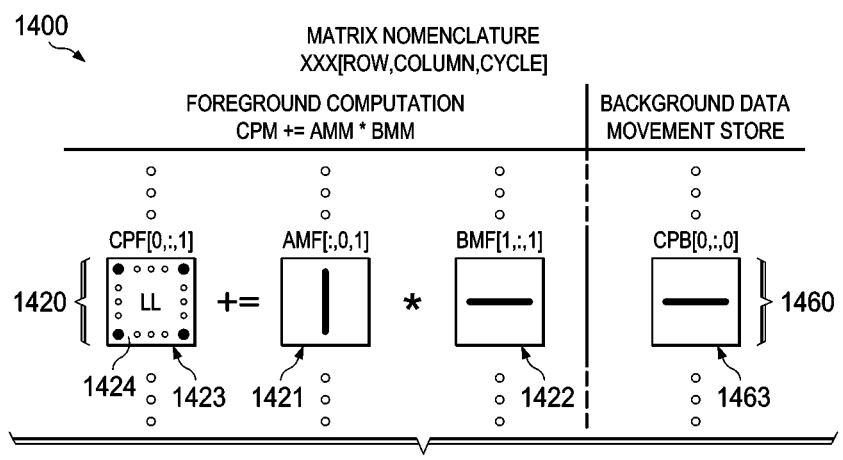
FIG. 14 illustrates an exemplary foreground/background execution/transfer STAGE 1 timing diagram depicting a preferred exemplary embodiment in which the OPM may be pipelined and overlapped such that a multiplication accumulation compute cycle may be overlapped with a data transfer between a local memory bus (LMB) and an external memory bus (EMB)
Figure 15:
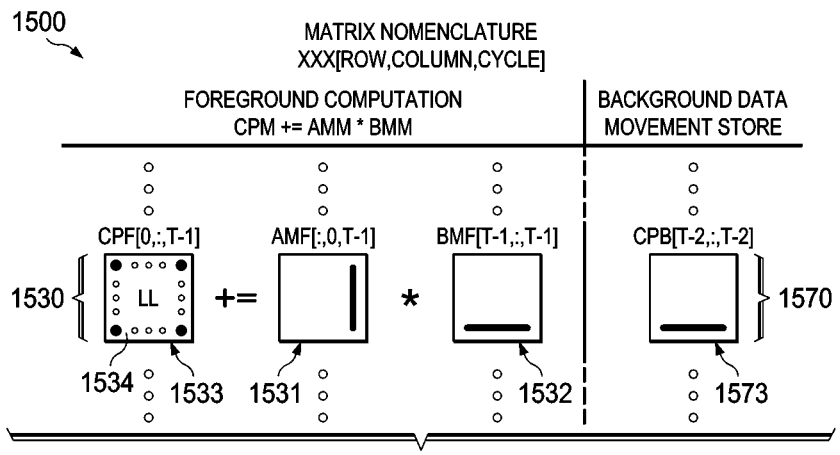
FIG. 15 illustrates an exemplary foreground/background execution/transfer STAGE N-1 pre-terminal timing diagram depicting a preferred exemplary embodiment in which the OPM may be pipelined and overlapped such that a multiplication/accumulation compute cycle may be overlapped with a data transfer between a local memory bus (LMB) and an external memory bus (EMB)

In example embodiments, the computation and data transfer operations may be pipelined and overlapped such that a multiplication/accumulation compute cycle may be overlapped with a data transfer between a local memory bus (LMB) and an external memory bus (EMB) (which is typically slower than the LMB). This overlap of execution/data transfer is generally depicted in FIG. 13 (1300), FIG. 14 (1400), FIG. 15 (1500), and/or FIG. 16 (1600) wherein an exemplary three-stage multiplication/accumulation operation incorporating foreground (1310, 1420, 1530, 1640) and background (1350, 1460, 1570, 1680) operations is illustrated. To achieve this compute/transfer overlap, a set of foreground (1310, 1420, 1530, 1640) and background (1350, 1460, 1570, 1680) registers is maintained in which a memory pointer or other hardware register is used to swap ("ping-pong") between the foreground/background memory/register sets. As depicted, the foreground (1310, 1420, 1530, 1640) and background (1350, 1460, 1570, 1680) registers represent two sets of registers that are selectively multiplexed by a foreground/background control signal that alternatively selects each primary set of registers associated with computation and a background set that are associated with data transfer operations. One skilled in the art will recognize that this represents a two-stage pipeline and can be expanded to include a number of foreground compute cycles (for example, each associated with the computation of an outer product in a COL×ROW multiplication operation) and a number of background data transfer operations (for example, each associated with the retrieval of a ROW element (transposed COL) of a BMM matrix or the storage of a ROW element of the CPM matrix).

Figure 16:
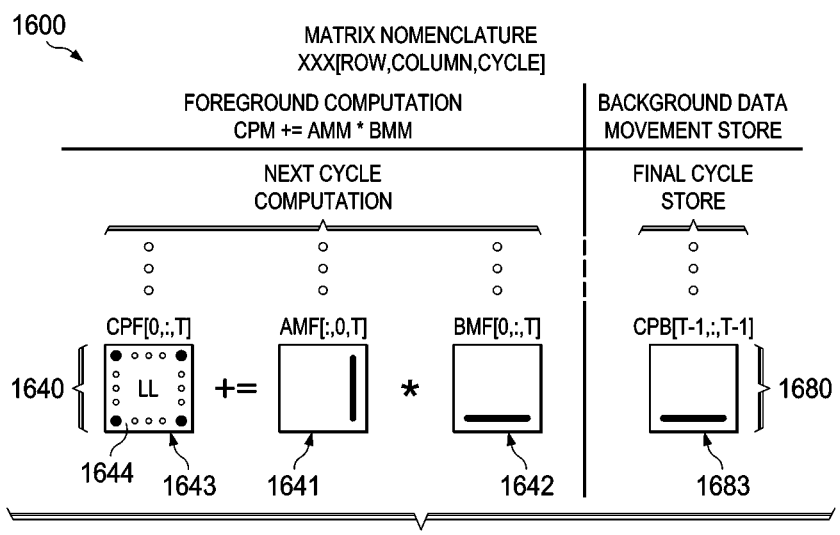
FIG. 16 illustrates an exemplary foreground/background execution/transfer STAGE N terminal timing diagram depicting a preferred exemplary embodiment in which the OPM may be pipelined and overlapped such that a multiplication accumulation compute cycle may be overlapped with a data transfer between a local memory bus (LMB) and an external memory bus (EMB)

An operational cycle may provide for the computation of CPM (+)=AMM*BMM by multiplying a column of AMF (1311) times a row of BMF (1312) to produce a point-wise product matrix that is summed to the CPF matrix (1313) result. During this compute cycle, a background data transfer may occur in parallel for the following two processes. For example, transfer of a previously computed CPM row result stored in the background CPB matrix (1353) to the EMB for storage in external memory. Computation of another CPF matrix (1423) executes in a similar fashion wherein a column of AMF (1421) multiplied by a row of BMF (1422) to produce a point-wise product matrix that sums to the CPF matrix (1423) result of the previous cycle. In conjunction with this operation, data transfer occurs to store the CPB row result (1463). These paired compute/transfer operations continue in sequence/parallel until the final computation of the last row element of the CPF matrix (1533) is then executed in a similar fashion wherein the last column of AMF (1531) is multiplied times the last row of BMF (1532) to produce a point-wise product matrix that is summed to the CPF matrix (1533) result. In conjunction with this operation, data transfer occurs to store the next-to-last CPB row result (1573). The cycle repeats as indicated in FIG. 16 (1600) wherein the computations of the last column and row elements of the CPF matrix (1643) is then executed allowing for the last column of AMF (1641) to be multiplied time the last row of BMF (1642) to continue until the last CPB row result (1683) is stored.

Note that while this compute/transfer overlap has been indicated such that computation of a CPF matrix (1314, 1424, 1534, 1644) results in a corresponding data transfer to store a CPB row and load a BMB row, it is also possible for the compute/transfer overlap to be sequenced such that a complete CPF matrix is computed during the CPB/BMB store/load data transfers. Thus, if the EMB is much slower than the LMB, the compute cycles associated with a complete ROW*COL product summation may be used to overlap the slower EMB-LMB data transfers that occur with the CMB and the BMB. Furthermore, as indicated elsewhere, the EMB may be shared among the AMM/BMM/CPM (and thus in this scenario shared among the AMF/BMF/CPF and AMB/BMB/CPB) in which data congestion may occur making data transfers to the EMB significantly slower and the need for full-row compute cycles to be performed to overlap the EMB data transfer. In other scenarios where the EMB separates among various elements of the AMF/BMF/CPF/AMB/BMB/CPB, it may be possible to simply overlap portions of the compute cycle with data transfer to minimize the wait time either for compute cycles to finish or for data transfer to the various EMB busses to occur.

Foreground Input Load and Processing Details (1700)-(1800)

As generally depicted in the processing flow of FIG. 17 (1700) and consistent with the previously discussed system architecture, a foreground input load and processing method may incorporate the following custom hardware logic processing steps:

(1) Load $a_{fore}$ and $b^T_{fore}$ from EDM input formatting logic (1701);
(2) Compute outer product $a_{fore}*b^T_{fore}$ using matrix $D_{fore}$ for compute gating (1702);
(3) Perform circular column rotation as specified by vector $R_{fore}$ (1703); and
(4) Perform product assignment or accumulation (1704);

This general method may be modified heavily depending on a number of factors, with rearrangement and/or addition/deletion of steps anticipated by the scope of the present disclosure. Integration of this and other preferred exemplary embodiment methods in conjunction with a variety of preferred exemplary embodiment systems described herein is anticipated by the overall scope of the present disclosure. Details of this OPM method are discussed below.

Load and Input Formatting

It should be noted that input formatting may include multi-dimension to one dimension transforms, even-odd splits, and other mappings to pull in data from local memory to the OPM inputs to realize additional algorithms.

Compute Gating

Compute gating may improve power efficiency as it allows the OPM to be balanced at different compute-to-data-movement ratios used by different algorithms when the data movement is fixed. This may be used to implement a wide variety of low-level algorithms that have compute-to-data-movement ratios that are smaller than full matrix-matrix multiplication.

A variety of $D_{fore}$ configurations (based on M and N parameters specifying the block batch size and K specifying cycles per inner matrix dimension) are within the scope of this disclosure. This may include built-in configurations for $D_{fore}$ that incorporate: all 1s; 1s for all values of each block and 0s elsewhere; 1s for diagonals of each block and 0s elsewhere; 1s for the first row of each block and 0s elsewhere (static and circular increment of 1s for each compute cycle); 1s for the first column of each block and 0s elsewhere (static and circular increment of 1s column for each compute cycle); and user programmable arbitrary data that may be loaded using extra data transfer cycles from EDM.

Circular Column Rotation

Circular column rotation implies the movement of memory before assignment or accumulation but that never physically occurs in many example embodiments. Instead, this circular rotation process can naturally occur in the foreground processing by routing during the assignment or accumulation step or in background processing via adding a column offset to the row select operations.

Example embodiments may include a variety of $R_{fore}$ vector configurations (based on M and N parameters specifying the block batch size and K specifying cycles per inner matrix dimension). These may include built-in configurations for $R_{fore}$ that may incorporate: all 0s; full size ramp (static and per cycle cyclical increment); block ramp size N (static and per cycle cyclical ramp); block offset (N entries of 0, N entries of M, N entries of 2*M, . . . ); block offset+block ramp; and arbitrary user-programmable shifting data that may be loaded using extra data transfer cycles from EDM.

Assignment or Accumulation

Example embodiments a number of built-in assignment/accumulation operations options including: assignment (=) for first cycle and accumulation (+=) for subsequent cycles; for all cycles; and += for all cycles.

Exemplary Input Loading and Processing Example (1800)

Figure 18:
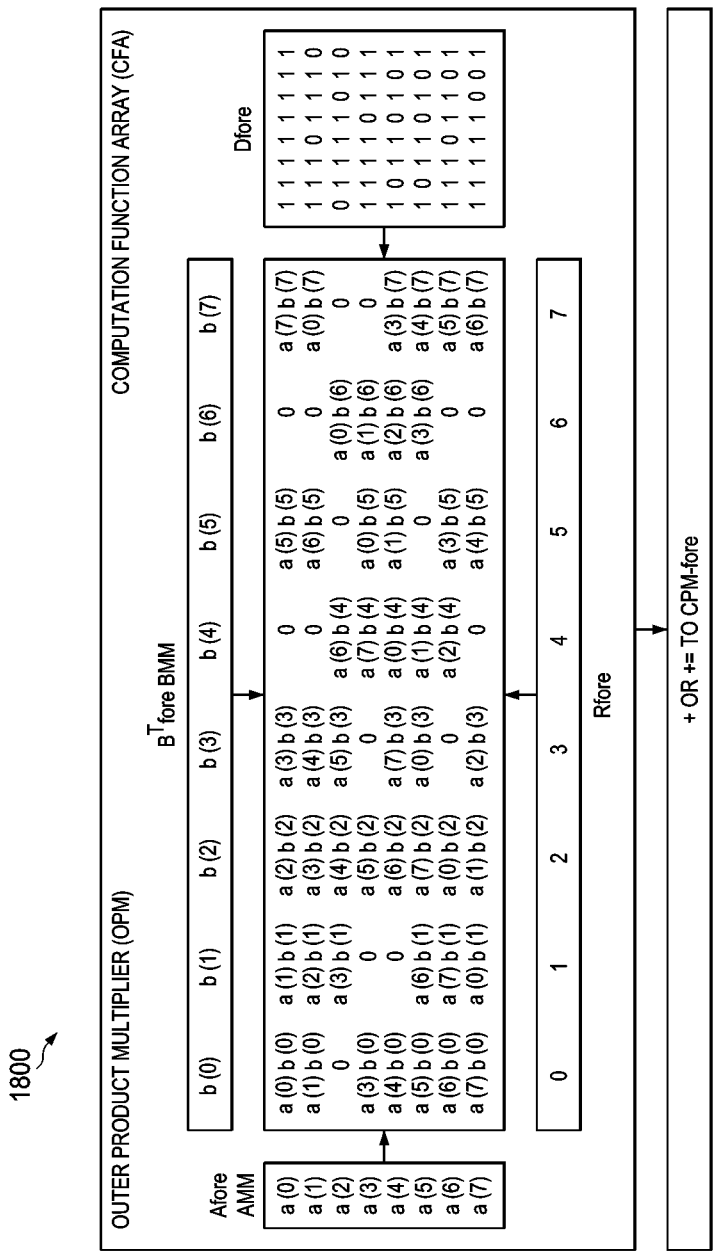
FIG. 18 illustrates an exemplary input loading and processing example depicting operation of the Dfore matrix and Rfore vector.

FIG. 18 (1800) provides an example showing a matrix size of T=8 with random compute gating matrix (Dfore) and a full size ramp circular column rotation for Rfore. Assignment/accumulation operations occur outside the frame of this example and are indicated on the bottom of the page. As can be seen from this example, the Afore/Bfore point-wise outer product is produced across the inner computation matrix and gated by the contents of Dfore. Where the Dfore data is 0, no computation is performed, and where the Dfore data is 1, the multiplication is performed. Furthermore, the column products shift according to the contents of the Rfore vector. For example, the far left (first) matrix column is unshifted as the Rfore vector indicates a 0 for the shift value. Similarly, the far right (last) matrix column is shifted up 7 matrix row elements vertically.

Background Output Processing and Data Storage (1900)-(2000)

As generally depicted in the processing flow of FIG. 19 (1900) and consistent with the previously discussed system architecture, a background output processing and data storage present disclosed method may be broadly described as incorporating the following custom hardware logic processing steps:

(1) Row select and associated bit processing (round, shift) (1901);
(2) Optional point-wise nonlinearity or summation (1902);
(3) Storing $c_{out}$ to output formatting logic (1903); and
(4) Writing the formatted result to EDM (1904).

This general method may be modified heavily depending on a number of factors, with rearrangement and/or addition/deletion of steps anticipated by the scope of the present disclosure. Integration of this and other preferred exemplary embodiment methods in conjunction with a variety of preferred exemplary embodiment systems described herein is anticipated by the overall scope of the present disclosure. Details of this OPM method are discussed below.

Row Selection/Bit Processing

As previously mentioned, row selection may be modified to accommodate circular column rotation. Accumulation is typically done at a higher precision than the input data precision; e.g., if input data is b bits per element, multiplication will result in 2*b bit products and accumulation will further increase the total precision by log 2(number of accumulations). Assuming that $C_{fore}$ and $C_{back}$ are stored at a*b bits of precision where a is a number such as 4, bit processing may be configured to perform rounding and shifting to create a b bit result or simply select a range of b bits.

Point-Wise Nonlinearity or Summation

In some examples, the OPM may provide two output paths (only one of which is used at a given time) that may include one vector data path and one scalar data path.

In the vector data path point-wise nonlinearities applied to matrix outputs may be implemented to support neural network applications and can also be used to implement other nonlinear operations with appropriate biasing (e.g., clamp). Note that this transformation is configured to a bypass mode for standard linear operations.

In the scalar data path, a sum operation that adds all the elements of the vector together may be implemented to improve the performance of inner products. Note that this may be configured to output data at the original or a higher precision and can alternatively operate on the $C_{back}$ row before bit processing is performed.

Storing and Output Formatting of $c_{out}$

Column removal, zero insertion, and other mappings may be implemented in some example embodiments and used in pushing data from the OPM to LDM to realize additional matrix functions. Other matrix functions may also be implemented using the examples and teachings provided herein.

Exemplary Background Output Processing and Storage Example (2000)

Figure 20:
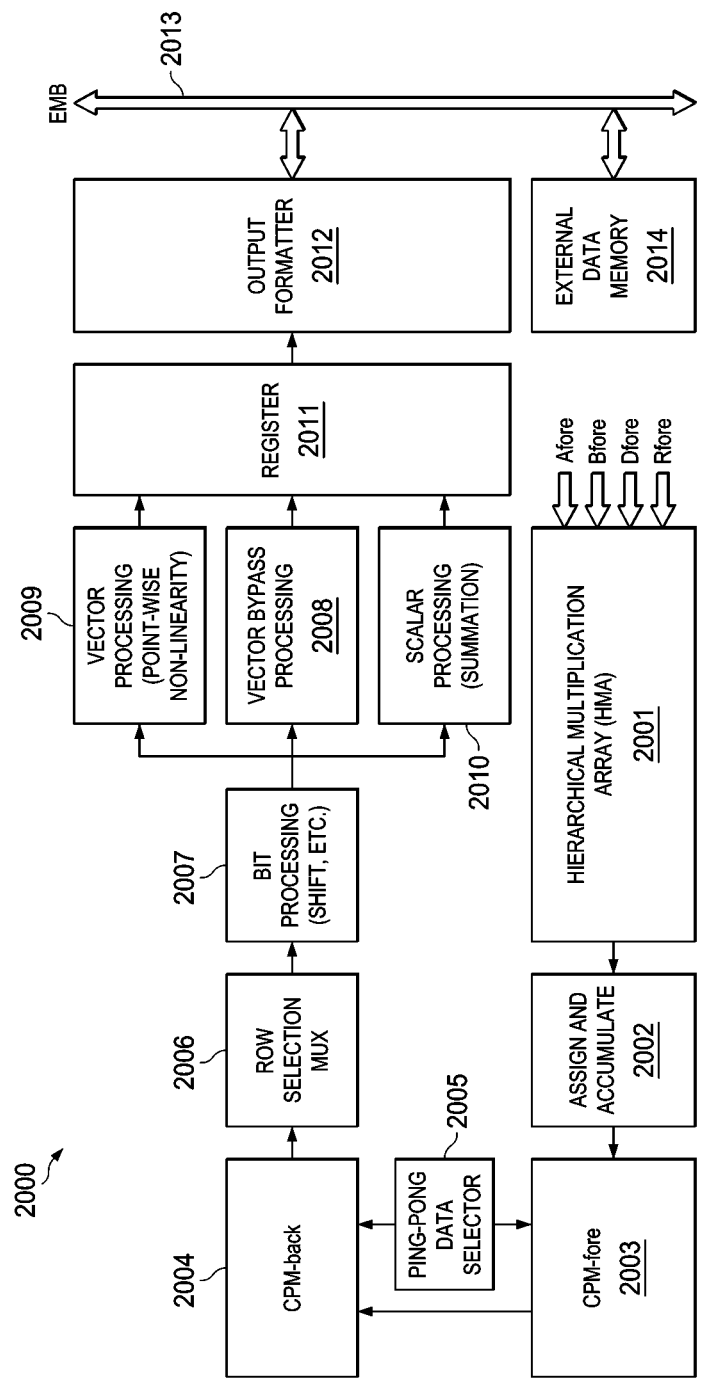
FIG. 20 illustrates logical background output processing and data storage data flow between major portions of an embodiment of the present disclosure.

FIG. 20 (2000) depicts typical data flow between system components in an example embodiment. Here it can be seen that the hierarchical multiplication array (HMA) (2001) takes input from the Afore, Bfore, Dfore, and Rfore matrices/vectors and produces an array of multiplication products that are assigned/accumulated (2002) to the CPM-fore registers (2003). The CPM-fore registers (2003) are periodically swapped (via address pointers) with CPM-back registers (2004) via a ping-pong data selector (2005) so that the CPM-back registers (2004) are available when the CPM-fore registers (2003) are being loaded with computation results from the assignment/accumulation (2002) and hierarchical multiplication array (HMA) (2001) operations. Data from the CPM-back registers (2004) is row selected by a multiplexer (2006) and then bit processed (2007) using bit shifting or other data transformation operators. The result of this bit processing (2007) is then presented to be processed either by a bypass vector processor (2008) that directly passes on the data, a vector processor (2009) incorporating point-wise non-linearity transform functions, or a scalar processor (2010) responsible for summing the vector output of the bit processor (2007) and producing a single scalar result. The output from these processors (2008, 2009, 2010) is stored in a register (2011) and presented to an output formatter (2012) that places the data on the EMB (2013) for transfer to the EDM (2014).

Computation Decision Matrix (CDM) Details

In some embodiments, a computation decision matrix (CDM) limits the number of computations required on a per cycle basis to reduce overall matrix compute cycle power dissipation. This is accomplished by gating computation of multiplications that are performed within the CPM result matrix. By gating the computation, it eliminates the computation from occurring, thus reducing overall system dynamic power consumption.

Within this context the CDM is often referred to as the Dfore matrix, as it is a matrix present in foreground processing of the matrix outer product. A number of built-in and custom (user-defined) configurations of the Dfore matrix are detailed below.

CDM Dfore Interpretation

The CDM Dfore matrix is, in some embodiments interpreted such that a zero matrix entry prevents the corresponding matrix product from being calculated and a non-zero matrix entry allows the corresponding matrix product to be calculated. This interpretation will be used in the following examples of possible CDM Dfore built-in modes.

Within the following discussion, the use of sub-matrix blocks will have associated parameters M for the number of rows in the block and N for the number of columns in the block. The parameter K specifies the number of cycles per inner matrix dimension parameter.

All-1s

An all-1s CDM configuration provides for calculation of all CPM matrix outer product entry values and is configured as follows:

$$D_{fore} = \begin{bmatrix} 1 & \cdots & 1 \\ \vdots & \ddots & \vdots \\ 1 & \cdots & 1 \end{bmatrix} \quad (3)$$

All-1s For All Values of Each Stock and 0s Elsewhere

An all-1s for all values of each block and 0s elsewhere CDM configuration provides for calculation of all CPM block matrix outer product entry values and is configured as follows:

$$D_{fore} = \begin{bmatrix} \begin{bmatrix} 1 & \cdots & 1 \\ \vdots & \ddots & \vdots \\ 1 & \cdots & 1 \end{bmatrix} & 0 & \cdots & 0 \\ 0 & \ddots & & \vdots \\ \vdots & & \ddots & 0 \\ 0 & \cdots & 0 & \begin{bmatrix} 1 & \cdots & 1 \\ \vdots & \ddots & \vdots \\ 1 & \cdots & 1 \end{bmatrix} \end{bmatrix} \quad (4)$$

All-1s For Diagonals of Each Block and 0s Elsewhere

An all-1s for diagonals of each block and 0s elsewhere CDM configuration provides for calculation of all CPM diagonal block matrix outer product entry values and is configured as follows:

$$D_{fore} = \begin{bmatrix} \begin{bmatrix} 1 & 0 & \cdots & 0 \\ 0 & \ddots & & \vdots \\ \vdots & & \ddots & 0 \\ 0 & \cdots & 0 & 1 \end{bmatrix} & 0 & \cdots & 0 \\ 0 & \ddots & & \vdots \\ \vdots & & \ddots & 0 \\ 0 & \cdots & 0 & \begin{bmatrix} 1 & 0 & \cdots & 0 \\ 0 & \ddots & & \vdots \\ \vdots & & \ddots & 0 \\ 0 & \cdots & 0 & 1 \end{bmatrix} \end{bmatrix} \quad (5)$$

Static All-1s For First Row of Each Block and 0s Elsewhere

A static all-1s for first row of each block and 0s elsewhere CDM configuration provides for calculation the first row CPM diagonal block matrix outer product entry values and is configured using sub-blocks of M×N elements:

$$D_{fore} = \begin{bmatrix} \begin{bmatrix} 1 & \cdots & 1 \\ 0 & \cdots & 0 \\ \vdots & & \vdots \\ 0 & \cdots & 0 \end{bmatrix} & 0 & \cdots & 0 \\ 0 & \ddots & & \vdots \\ \vdots & & \ddots & 0 \\ 0 & \cdots & 0 & \begin{bmatrix} 1 & \cdots & 1 \\ 0 & \cdots & 0 \\ \vdots & & \vdots \\ 0 & \cdots & 0 \end{bmatrix} \end{bmatrix} \quad (6)$$

Circular Rotate All-1s For First Row of Each Block and 0s Elsewhere

A circular rotate all-1s for first row of each block and 0s elsewhere CDM configuration provides for calculation the sequential rows of the CPM diagonal block matrix outer product entry values and is configured using sub-blocks of M×N elements. A typical time sequence for this CDM automates the migration of the 1s row for each sequential time calculation step as follows:

$$D_{fore}(t=0) = \begin{bmatrix} \begin{bmatrix} 1 & \cdots & 1 \\ 0 & \cdots & 0 \\ \vdots & & \vdots \\ 0 & \cdots & 0 \end{bmatrix} & 0 & \cdots & 0 \\ 0 & \ddots & & \vdots \\ \vdots & & \ddots & 0 \\ 0 & \cdots & 0 & \begin{bmatrix} 1 & \cdots & 1 \\ 0 & \cdots & 0 \\ \vdots & & \vdots \\ 0 & \cdots & 0 \end{bmatrix} \end{bmatrix} \quad (7)$$

$$D_{fore}(t=1) = \begin{bmatrix} \begin{bmatrix} 0 & \cdots & 0 \\ 1 & \cdots & 1 \\ 0 & \cdots & 0 \\ \vdots & & \vdots \\ 0 & \cdots & 0 \end{bmatrix} & 0 & \cdots & 0 \\ 0 & \ddots & & \vdots \\ \vdots & & \ddots & 0 \\ 0 & \cdots & 0 & \begin{bmatrix} 0 & \cdots & 0 \\ 1 & \cdots & 1 \\ 0 & \cdots & 0 \\ \vdots & & \vdots \\ 0 & \cdots & 0 \end{bmatrix} \end{bmatrix} \quad (8)$$

$$D_{fore}(t=M-1) = \begin{bmatrix} \begin{bmatrix} 0 & \cdots & 0 \\ \vdots & & \vdots \\ 0 & \cdots & 0 \\ 1 & \cdots & 1 \end{bmatrix} & 0 & \cdots & 0 \\ 0 & \ddots & & \vdots \\ \vdots & & \ddots & 0 \\ 0 & \cdots & 0 & \begin{bmatrix} 0 & \cdots & 0 \\ \vdots & & \vdots \\ 0 & \cdots & 0 \\ 1 & \cdots & 1 \end{bmatrix} \end{bmatrix} \quad (9)$$

$$D_{fore}(t=M) = D_{fore}(t=0) \quad (10)$$

$$D_{fore}(t=M+1) = D_{fore}(t=1) \quad (11)$$

As can be seen from the last two equations the all-1s row circularly rotates within the Dfore matrix every M computation cycles.

Static All-1s For First Column of Each Block and 0s Elsewhere

A static all-1s for first column of each block and 0s elsewhere CDM configuration provides for calculation the first column CPM diagonal block matrix outer product entry values and is configured using sub-blocks of M×N elements:

$$D_{fore} = \begin{bmatrix} \begin{bmatrix} 1 & 0 & \cdots & 0 \\ \vdots & \vdots & & \vdots \\ 1 & 0 & \cdots & 0 \end{bmatrix} & 0 & \cdots & & 0 \\ 0 & \ddots & & \vdots \\ \vdots & & \ddots & 0 \\ 0 & \cdots & 0 & \begin{bmatrix} 1 & 0 & \cdots & 0 \\ \vdots & \vdots & & \vdots \\ 1 & 0 & \cdots & 0 \end{bmatrix} \end{bmatrix} \quad (12)$$

Circular Rotate All-1s For First Column of Each Block and 0s Elsewhere

A circular rotate all-1s for first column of each block and 0s elsewhere CDM configuration provides for calculation the sequential columns of the CPM diagonal block matrix outer product entry values and is configured using sub-blocks of M×N elements. A typical time sequence for this CDM automates the migration of the 1s column for each sequential time calculation step as follows:

$$D_{fore} = \begin{bmatrix} \begin{bmatrix} 1 & 0 & \cdots & 0 \\ \vdots & \vdots & & \vdots \\ 1 & 0 & \cdots & 0 \end{bmatrix} & 0 & \cdots & & 0 \\ 0 & \ddots & & \vdots \\ \vdots & & \ddots & 0 \\ 0 & \cdots & 0 & \begin{bmatrix} 1 & 0 & \cdots & 0 \\ \vdots & \vdots & & \vdots \\ 1 & 0 & \cdots & 0 \end{bmatrix} \end{bmatrix} \quad (13)$$

$$D_{fore}(t=1) = \begin{bmatrix} \begin{bmatrix} 0 & 1 & 0 & \cdots & 0 \\ \vdots & \vdots & \vdots & & \vdots \\ 0 & 1 & 0 & \cdots & 0 \end{bmatrix} & 0 & \cdots & & 0 \\ 0 & \ddots & & \vdots \\ \vdots & & \ddots & 0 \\ 0 & \cdots & 0 & \begin{bmatrix} 0 & 1 & 0 & \cdots & 0 \\ \vdots & \vdots & \vdots & & \vdots \\ 0 & 1 & 0 & \cdots & 0 \end{bmatrix} \end{bmatrix} \quad (14)$$

$$D_{fore}(t=N-1) = \begin{bmatrix} \begin{bmatrix} 0 & \cdots & 0 & 1 \\ \vdots & & \vdots & \vdots \\ 0 & \cdots & 0 & 1 \end{bmatrix} & 0 & \cdots & & 0 \\ 0 & \ddots & & \vdots \\ \vdots & & \ddots & 0 \\ 0 & \cdots & 0 & \begin{bmatrix} 0 & \cdots & 0 & 1 \\ \vdots & & \vdots & \vdots \\ 0 & \cdots & 0 & 1 \end{bmatrix} \end{bmatrix} \quad (15)$$

$$D_{fore}(t=N) = D_{fore}(t=0) \quad (16)$$

$$D_{fore}(t=N+1) = D_{fore}(t=1) \quad (17)$$

As can be seen from the last two equations the all-1s column circularly rotates within the Dfore matrix every N computation cycles.

Programmable CDM Data

The present disclosure anticipates user-programmable CDM configurations in which the HMA gates matrix product computations based on the CDM and the CDM is defined based on programmable arbitrary data loaded from the EDM. This arbitrary CDM matrix will have the form:

$$D_{fore} = \begin{bmatrix} d_{0,0} & d_{0,1} & \cdots & d_{0,T-1} \\ d_{1,0} & d_{1,1} & \cdots & d_{1,T-1} \\ \vdots & \vdots & & \vdots \\ d_{T-1,0} & d_{T-1,1} & \cdots & d_{T-1,T-1} \end{bmatrix} \quad (18)$$

and may contain arbitrary (0/1) data d[i,j] loaded from the EDM.

Circular Column Rotation Vector (CRV) Details

In some embodiments, a circular column rotation vector (CRV) automates input/output data formatting to reduce the number of data transfer operations required to achieve a given matrix computation result. This is accomplished by shifting multiplication products within the CPM product matrix based on data stored in the CRV.

Within this context, the CRV may be referred to as the Rfore vector, as it is a vector used in foreground processing of the matrix outer product results after the Dfore matrix is applied to the matrix outer product computations. A number of built-in and custom (user-defined) configurations of the Rfore vector are detailed below.

CRV Rfore Interpretation

The CRV Rfore vector, in some embodiments, may be interpreted such that each vector element defines a shift value applied to the CPM address location in which the outer product computation result is stored. Thus, each CRV value represents an offset, which is applied circularly to the output row address within the CPM to which an individual outer product element is stored. This interpretation will be used in the following examples of possible CRV Rfore built-in modes.

Within the following discussion, the use of sub-matrix blocks will have associated parameters M for the number of rows in the block and N for the number of columns in the block. The parameter K specifies the number of cycles per inner matrix dimension parameter.

All-0s

An all-0s CRV configuration provides for no output shifting of calculated outer products from the HMA and is configured as follows:

$$R_{fore} = [0 \ldots 0] \quad (19)$$

Static Full Size Ramp

A static full size ramp CRV configuration provides for sequential output shifting of calculated outer products from the HMA and is configured as follows:

$$R_{fore} = [0 \ 1 \ldots T-1] \quad (20)$$

Full Size Ramp With Per Cycle Cyclical Increment

A full size ramp with per cycle cyclical increment CRV configuration provides for sequentially incremented output shifting of calculated outer products from the HMA. A typical time sequence for this CRV automates the shifting of the rows for each sequential time calculation step as follows:

$$R_{fore}(T=0)=[0\ 1\ \ldots\ T-2\ T-1] \quad (21)$$

$$R_{fore}(T=1)=[1\ 2\ \ldots\ T-1\ 0] \quad (22)$$

$$R_{fore}(T=2)=[2\ 3\ \ldots\ 0\ 1] \quad (23)$$

This sequence continues indefinitely as indicated.

Static Block Ramp

A static block ramp CRY configuration provides for repeated N-sequential output shifting of calculated outer products from the HMA and is configured as follows:

$$R_{fore}[\{0\ 1\ \ldots\ N-1\}\ \ldots\ \{0\ 1\ \ldots\ N-1\}] \quad (24)$$

Block Ramp With Per Cycle Cyclical Increment

A block ramp with per cycle cyclical increment CRV configuration provides for N-sequentially incremented output shifting of calculated outer products from the HMA. A typical time sequence for this CRV automates the shifting of the rows for each sequential time calculation step as follows:

$$R_{fore}(T=0)=[\{0\ 1\ \ldots\ N-1\}\ \ldots\ \{0\ 1\ \ldots\ N-1\}] \quad (25)$$

$$R_{fore}(T=1)=[\{1\ 2\ \ldots\ 0\}\ \ldots\ \{1\ 2\ \ldots\ 0\}] \quad (26)$$

$$R_{fore}(T=2)=[\{3\ 4\ \ldots\ 1\}\ \ldots\ \{2\ 3\ \ldots\ 1\}] \quad (27)$$

This sequence continues indefinitely as indicated,

Block Offset

A block offset CRV configuration provides for N-sequential output shifting of calculated outer products by a given block offSet M from the HMA and is configured as follows:

$$R_{fore}=[\{0\ \ldots\ 0\}\{M\ \ldots\ M\}\ \ldots\ ] \quad (28)$$

Where the blocks of $\{0\ \ldots\ 0\}$, $\{M\ \ldots\ M\}$, and those that follow are each N elements in length.

Block Offset+Block Ramp

A block offset+block ramp CRV configuration provides for N-sequential output shifting of calculated outer products by a sequentially increasing block offset M from the HMA and is configured as follows:

$$R_{fore}=[\{0\ 1\ \ldots\ N-1\}\{M\ m+1\ \ldots\ M+N-1\}\ \ldots\ ] \quad (29)$$

Where the blocks of $\{0\ 1\ \ldots\ N-1\}$ $\{M\ M+1\ \ldots\ M+N-1\}$, and those that follow are each N elements in length.

Programmable CRV Data

Example embodiments may include user-programmable CRV configurations in which the HMA shifts matrix product computations based on the CRV and the CRV is defined based on programmable arbitrary data loaded from the EDM. This arbitrary CRV vector will have the form:

$$R_{fore}=[r_0\ r_1\ \ldots\ r_{T-1}] \quad (30)$$

Note that there are no constraints on the shift pattern contents for r[i].

Block Matrix Processing (2100)-(2400)

In some preferred embodiments, the present disclosure may be advantageously applied to processing FULL SIZE matrix operations in which the entire matrix of interest is computed in one operation. In other preferred embodiments, the present disclosure may be advantageously applied to processing BLOCK matrix operations in which the matrix of interest is divided into sub-matrix blocks for block processing. An example of this block processing is provided in FIG. 21 (2100)-FIG. 24 (2400). Referencing FIG. 21 (2100), an exemplary block-based matrix multiplication is shown in which a column of block matrices A (2110) is multiplied by a column of block matrices B (2120) to generate a column of block matrices C (2130). In this example, it would be desirable to compute these products in T/4 cycles, where the relation M=N=K=T/4 holds and M, N, and K define the matrix sizing parameters.

Figure 22:
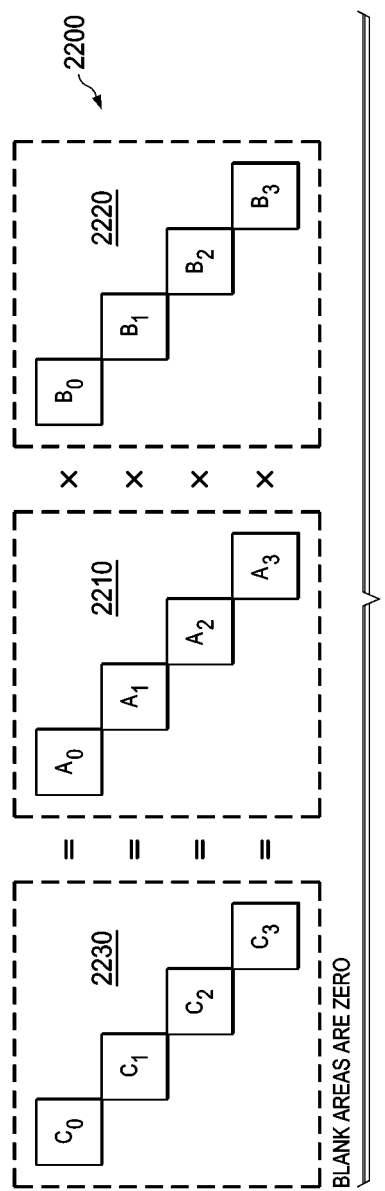
FIG. 22 illustrates a methodology of implementing the block-based matrix multiplication of FIG. 21.

FIG. 22 (2200) details how this block multiply would normally be constructed using traditional matrix-matrix multiplication with AMM (2210), BMM (2220), and CPM (2230) matrices incorporating the sub-matrix blocks depicted in FIG. 21 (2100). Here it can be seen that the dimensions of each of the matrices is T and thus it would take T cycles to perform the matrix-matrix multiplication using prior art multiplication techniques. This T cycle execution time is four times the time of T/4 that is desired.

Figure 23:
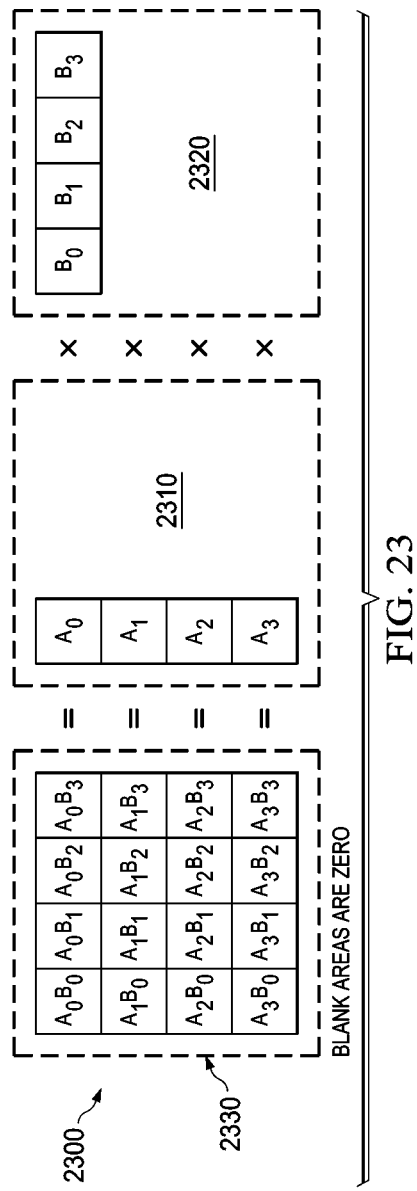
FIG. 23 illustrates an example approach for generating a diagonal of block matrix products conforming to the desired matrix product of FIG. 21.

Example embodiments formulate the desired block matrix-matrix multiplication in terms of an outer product multiplication as generally depicted in FIG. 23 (2300), wherein the AMM (2310) matrix is formed from a column of the A block sub-matrices and the BMM (2320) matrix is formed from a row of the B block sub-matrices. The outer product of these two matrices is then the CPM (2330) matrix as shown. Note that only the diagonal of this CPM matrix (2330) constitutes a diagonal of desired product blocks and that all other entries should be zero in the desired computation (compare (2330) to (2230)).

Figure 24:
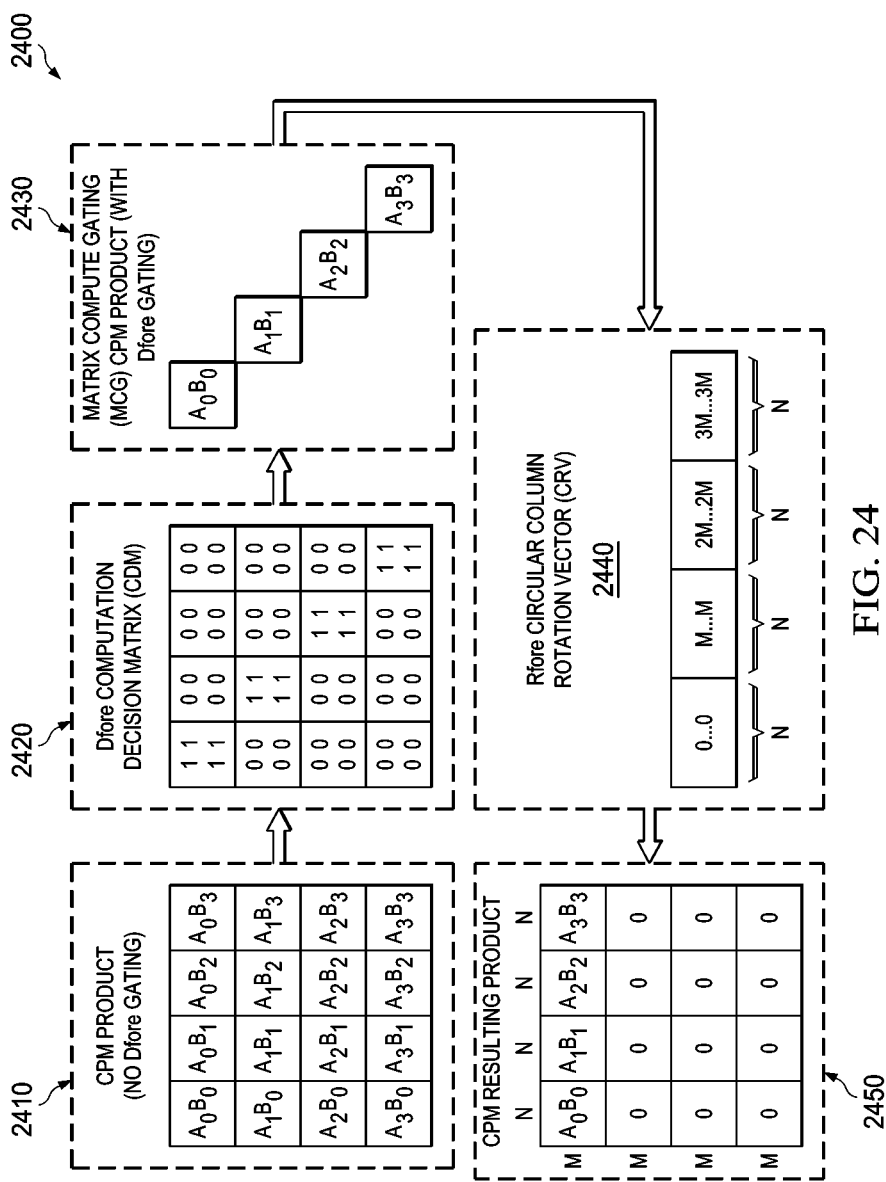
FIG. 24 illustrates an example approach for generating a desired matrix product of FIG. 21 using outer product multiplication in conjunction with a Dfore computation decision matrix (CDM) and a Rfore circular column rotation vector (CRV).

Example embodiments allow the CPM (2330) product matrix of FIG. 23 (2300) to be modified for both computation and formatting purposes by the application of the Dfore matrix and Rfore vector as generally depicted in FIG. 24 (2400). Here it can be seen that a CPM matrix (2410) is depicted with no compute gating or circular formatting. The computation decision matrix (CDM) Dfore (2420) is used when computing this CPM matrix (2410) to compute only products that are needed in the desired output computation. The result of this is that only products in the gated matrix (2430) are produced as a result of the Dfore (2420) computation gating. In this example the Rfore circular column rotation vector (CRV) (2440) is configured to perform no shifting on the first $A_0B_0$ block, M offset shifting on the $A_1B_1$ block, 2M offset shifting on the $A_2B_2$ block, and 3M shifting on the $A_3B_3$ block. This Rfore (2440) shifting results in the CPM resulting product matrix (2450) having shifted elements for blocks $A_1B_1$, $A_2B_2$, and $A_3B_3$ as illustrated.

Note that all of these processes depicted in FIG. 21 (2100)-FIG. 24 (2400) occur without the need for ACL/CPU copying of data or other data movement within the OPM. Internal data gating and routing within the OPM allows these operations to occur transparent of the ACL/CPU. This internal gating and data routing results in overall faster execution times while simultaneously reducing overall system power consumption as each extraneous data transfer or matrix computation in traditional system implementations increases dynamic power consumption and additional data transfers always increase overall execution time, especially to EDM that comprises DRAM.

OPM Exemplary Instruction Format

Some embodiments may implement OPM operations in the form of CONFIGURATION and COMPUTATION in which registers first initialize with operational details and then computation functions are executed on data loaded in particular matrix registers. The following tables generally detail parameters associated with an example embodiment implementing these CONFIGURATION and COMPUTATION instruction formats. One skilled in the art will recognize that other setup/instruction formats including different encoding are possible using the teachings of the present disclosure.

| Outer Product Multiplier (OPM) Setup CONFIGURATION | | |
|---|---|---|
| | FIELD SIZE | BLOCK BASED |
| Input data type | 4 bits | precision, sign |
| Output data type | 4 bits | precision, sign |
| M | $\log_2(T)$ bits | block row dimension (assume repeat) |
| N | $\log_2(T)$ bits | block column dimension (assume repeat) |
| $D_{fore}$ | 4 bits | built-in mode or arbitrary pattern (arbitrary pattern assumes additional transmission of patterns) |
| $R_{fore}$ | 4 bits | built-in mode or arbitrary pattern (arbitrary pattern assumes additional transmission of patterns) |
| Scalar/vector | 1 bit | Select output type |
| Point-wise nonlinearity | 1 bit | enable/disable |
| Round/shift | $\log_2(T) + 4$ bits | type and value |

| Outer Product Multiplier (OPM) Execution COMPUTATION | | |
|---|---|---|
| FUNCTION/Operands | FULL SIZE | BLOCK BASED |
| LOAD | | |
| $a_{fore}$ | address bits | source |
| $b^T_{fore}$ | address bits | source |
| STORE | | |
| $C_{back}$ | address bits | destination |
| EXECUTE | | |
| swap | 1 bit | swap $C_{fore}$ and $C_{back}$ before subsequent operations |
| K | 16 bits | number of inputs to process (vectors or cycles) |
| operation | 2 bits | none; = for 1st cycle, += for subsequent cycles; = for all cycles; += for all cycles |

Comparison to Inner Product Multiplier

Example embodiments may be compared and contrasted to traditional matrix multiplication accelerators (MMAs) in the following manner. Both the inner and outer product versions of the MMA have a matrix multiplier at their core and both can implement the same set of low level algorithms using different combinations of enhancements. The choice between the inner product multiplier (IPM) (as discussed in references included within this patent application) and an outer product multiplier (OPM) as implemented in the disclosed system typically embedded within a SOC system is generally a function of other tradeoffs.

Positive aspects of the OPM include:
Reduced latency (no need to pre load a $B_{back}$ matrix before computation);
No $B_{back}$ storage; and
Natural transpose support vs separate mode.
Positive aspects of the EIP include:
T accumulators (vs $T^2$ accumulators);
$A_{fore}$ loaded in row major order for matrix-matrix multiplication (not a material benefit for cases where A is known ahead of time can be stored in col major order for the enhanced outer product MMA; otherwise a transpose is required); and
Natural inner product support vs. separate output mode.

Computation/Data Transfer Balance

Example embodiments attempt to balance the time spent in computation and data transfer within an overall system computation context so that processing time is not unnecessarily wasted in transferring data to/from a matrix compute engine (MCE) for the purposes of executing a matrix computation. Because the matrices used in many CNN-style and other computations are very large, it is possible for time spent in data movement to swamp the time spent actually computing matrix products and other functions. Thus, it is highly desirable to balance the compute and data transfer functions within such a system application context.

An informal definition of balance can be observed from the following premises:
Let t be an interval of time (e.g., 1 cycle for a processor);
Let input x(t) and output y(t) be arbitrarily sized, possibly aggregating multiple inputs and/or outputs; and
Let function $f(\ )$ map inputs to outputs with delay d as $y(t)=f(x(t-d))$, $t=d, d+1, \ldots$.
An implementation off is balanced if:
x(t) and y(t) exactly consume all of the input and output bandwidth of the implementation; and
$f(\ )$ exactly consumes all of the compute resources of the implementation.

Balance is important for efficient implementations as it implies that no excess power is wasted in data movement or compute.

The OPM is defined such that matrix-matrix multiplication with T×T matrices is perfectly balanced (i.e., it is not data movement or compute limited and there is no excess data movement or compute resources not being used). Within this context, the question arises as to how to make a variety of algorithms other than T×T matrix-matrix multiplication perfectly balance on the OPM. Note that many algorithms have smaller compute to data movement ratios that full matrix-matrix multiplication. Many algorithms have smaller compute to data movement ratios, implying that there needs to be a way to turn off unnecessary OPM compute operations. The implicit reason for this is power efficiency, in that excess matrix compute operations degrade overall system power efficiency.

The answer to this power/throughput problem as provided by example embodiments is to use the matrix compute gating (MCG) based on a computation decision matrix (CDM) with the compute matrix $D_{fore}$ to reduce the compute capability and circular column rotation with circular column rotation vector (CRV) $R_{fore}$ to achieve full output bandwidth. Thus, disclosed embodiments may augment data movement with circular column rotation to improve throughput while simultaneously allowing compute operations to be gated to minimize the overall system power consumption by reducing unnecessary compute operations.

Exemplary Low Level OPM Hardware Function Implementations

Example configurations and computations for the OPM are shown on subsequent pages to implement the following full size and batch block based low level algorithms:

Matrix-matrix multiplication;

Matrix-matrix point-wise multiplication;

Matrix-matrix addition;

Matrix-matrix assignment;

Vector-vector point-wise multiplication;

Vector-vector addition;

Vector-vector assignment;

Matrix-vector multiplication;

Vector-vector inner product;

Matrix transpose;

Matrix row permutation; and

Vector column permutation.

Note that there are a number of application contexts for creating more complex hardware equivalent functions using these low-level OPM hardware functions. As a first example, it is possible to combine these low-level hardware functions (e.g., FFTs can be built using the four-step sequence of: matrix-matrix multiplication, matrix-matrix point-wise multiplication, matrix-matrix multiplication, and transpose). As a second example, it is also possible to combine these low-level hardware functions with appropriate input and output formatting (e.g., multidimensional data mapping on the input and column removal on the output allows CNN style 2D convolution).

Matrix-Matrix Multiplication (C=A*B)

The present disclosure in some preferred embodiments may implement matrix-matrix multiplication of the form C=A*B. The following tables provide CONFIGURATION and COMPUTATION details for FULL SIZE and BLOCK BASED matrix operations for this OPM operator.

Matrix-Matrix Multiplication (C = A * B)
CONFIGURATION

| | FULL SIZE | BLOCK BASED |
|---|---|---|
| Input data type | precision, sign | precision, sign |
| Output data type | precision, sign | precision, sign |
| M | T | block rows |
| N | T | block cols |
| $D_{fore}$ | 1s for all values of each block; 0s elsewhere | 1s for all values of each block; 0s elsewhere |
| $R_{fore}$ | block offset (N entries of 0, . . . ) | block offset (N entries of 0, N entries of M, N entries of 2 * M, . . . ) |
| Scalar/vector output | vector | vector |
| Point-wise nonlinearity | disable | disable |
| Round/shift | type and value | type and value |

Matrix-Matrix Multiplication (C = A * B)
COMPUTATION

| FUNCTION/ Operands | FULL SIZE | BLOCK BASED |
|---|---|---|
| LOAD | | |
| $a_{fore}$ | sequential columns of A | sequential columns of all blocks of A concatenated vertically |
| $b^T_{fore}$ | sequential rows of B | sequential rows of all blocks of B concatenated horizontally |
| STORE | | |
| $C_{back}$ | sequential rows of C | sequential rows of all blocks of C concatenated horizontally (M rows to save) |
| EXECUTE | | |
| Swap | yes | yes |
| K | T | block inner dimension |
| Operation | for 1st cycle; + = for subsequent cycles | for 1st cycle; + = for subsequent cycles |

Matrix-Matrix/Vector-Vector Point-Wise Multiplication (C=A*B)

Some preferred embodiments may implement point-wise matrix-matrix multiplication and point-wise vector-vector multiplication of the form C=A.*B and c=a.*b (Hadamard product). The following tables provide CONFIGURATION and COMPUTATION details for FULL SIZE and BLOCK BASED matrix operations for this QPM operator.

Matrix-Matrix Point-Wise Multiplication (C = A. * B)
Vector-Vector Point-Wise Multiplication (c = a. * b)
CONFIGURATION

| | FULL SIZE | BLOCK BASED |
|---|---|---|
| Input data type | precision, sign | precision, sign |
| Output data type | precision, sign | precision, sign |
| M | T | block rows |
| N | T | T |
| $D_{fore}$ | 1s for main diagonal 0s elsewhere | 1s for main diagonal 0s elsewhere |
| $R_{fore}$ | full size ramp with per cycle cyclical increment | full size ramp with per cycle cyclical increment |
| Scalar/vector output | vector | vector |
| Point-wise nonlinearity | disable | disable |
| Round/shift | type and value | type and value |

Matrix-Matrix Point-Wise Multiplication (C = A. * B)
Vector-Vector Point-Wise Multiplication (c = a. * b)
COMPUTATION

| FUNCTION/Operands | FULL SIZE | BLOCK BASED |
|---|---|---|
| LOAD | | |
| $a_{fore}$ | sequential rows of A | sequential rows of all blocks of A concatenated horizontally (M rows to load) |
| $b^T$fore | sequential rows of B | sequential rows of all blocks of B concatenated horizontally (M rows to load) |

-continued

| Matrix-Matrix Point-Wise Multiplication (C = A. * B) Vector-Vector Point-Wise Multiplication (c = a. * b) COMPUTATION | | |
|---|---|---|
| FUNCTION/Operands | FULL SIZE | BLOCK BASED |
| STORE | | |
| $C_{back}$ | sequential rows of C | sequential rows of all blocks of C concatenated horizontally (M rows to save) |
| EXECUTE | | |
| Swap | yes | yes |
| K | T | block rows |
| Operation | =in 1st cycle; +=in other cycles | =in 1st cycle; +=in other cycles |

Matrix and Vector Addition (C=A+B)

Matrix and vector addition hardware functions are computed using two applications of point-wise multiplication with J defined as an all-1s matrix. Using the matrix relations:

$$C = A + B \quad \text{where,} \quad (31)$$
$$= I * A + I * B$$
$$= J.*A + J.*B$$

$$I = \begin{bmatrix} 1 & 0 & \cdots & 0 \\ 0 & & & \vdots \\ \vdots & & & 0 \\ 0 & \cdots & 0 & 1 \end{bmatrix}, J = \begin{bmatrix} 1 & \cdots & 1 \\ \vdots & \ddots & \vdots \\ 1 & \cdots & 1 \end{bmatrix}$$

the operational sequence to implement addition is provided by the following hardware functions:

$$C = J.*A \quad (32)$$

$$C += J.*B \quad (33)$$

Matrix and Vector Assignment (C=B)

Matrix and vector assignment hardware functions are computed using one application of point-wise multiplication with J defined as an all-1s matrix. Using the matrix relations:

$$C = B \quad \text{where,} \quad (34)$$
$$= I * B$$
$$= J.*B$$

$$I = \begin{bmatrix} 1 & 0 & \cdots & 0 \\ 0 & & & \vdots \\ \vdots & & & 0 \\ 0 & \cdots & 0 & 1 \end{bmatrix}, J = \begin{bmatrix} 1 & \cdots & 1 \\ \vdots & \ddots & \vdots \\ 1 & \cdots & 1 \end{bmatrix}$$

the operational sequence to implement addition is provided by the following hardware function:

$$C = J.*B \quad (35)$$

Matrix-Vector Multiplication (c=a*B–B in Row Major Order)

Some preferred embodiments may implement matrix-vector multiplication of the form c=a*B with B in row major order. The following tables provide CONFIGURATION and COMPUTATION details for FULL SIZE and BLOCK BASED matrix operations for this OPM operator.

| Matrix-Vector Multiplication (c = a * B with B in row major order) CONFIGURATION | | |
|---|---|---|
| | FULL SIZE | BLOCK BASED |
| input data type | precision, sign | precision, sign |
| Output data type | precision, sign | precision, sign |
| M | T | block rows |
| N | T | block cols |
| $D_{fore}$ | 1s for 1st row of each block; 0s elsewhere | 1s for 1st row of each block; 0s elsewhere |
| $R_{fore}$ | all 0s | block offset (N entries of 0, N entries of M, N entries of 2 * M, ...) |
| Scalar/vector output | vector | vector |
| Point-wise nonlinearity | disable | disable |
| Round/shift | type and value | type and value |

| Matrix-Vector Multiplication (c = a * B with B in row major order) COMPUTATION | | |
|---|---|---|
| FUNCTION/Operands | FULL SIZE | BLOCK BASED |
| LOAD | | |
| $a_{fore}$ | sequential elements of a concatenated with 0s | sequential elements of all a vectors spaced with M−1 0s concatenated |
| $b^T_{fore}$ | sequential rows of B | sequential rows of all blocks of B concatenated horizontally |
| STORE | | |
| $C_{back}$ | the 1st row of c | the 1st row of all blocks of c concatenated horizontally |
| EXECUTE | | |
| Swap | yes | yes |
| K | T | block inner dimension |
| Operation | =in 1st cycle; +=in other cycles | =in 1st cycle; +=in other cycles |

Matrix-Vector Multiplication (c=A*b–A in Column Major Order)

Some preferred embodiments may implement matrix-vector multiplication of the form c=A*b with A in column major order. The following tables provide CONFIGURATION and COMPUTATION details for FULL SIZE (OPTION 1) and FULL SIZE (OPTION 2) matrix operations for this OPM operator.

| Matrix-Vector Multiplication (c = A * b with A in column major order) CONFIGURATION | | |
| --- | --- | --- |
| | FULL SIZE (OPTION 1) | FULL SIZE (OPTION 2) |
| Input data type | precision, sign | precision, sign |
| Output data type | precision, sign | precision, sign |
| M | T | T |
| N | T | T |
| $D_{fore}$ | 1s for 1st col of each block; 0s elsewhere | 1s for diagonals of each block; 0s elsewhere |
| $R_{fore}$ | all 0s | full size ramp |
| Scalar/vector output | vector | vector |
| Point-wise nonlinearity | disable | disable |
| Round/shift | type and value | type and value |

| Matrix-Vector Multiplication (c = A * b with A in column major order) COMPUTATION | | |
| --- | --- | --- |
| FUNCTION/ Operands | FULL SIZE (OPTION 1) | FULL SIZE (OPTION 2) |
| LOAD | | |
| $a_{fore}$ | sequential columns of A | sequential columns of A |
| $b^T{fore}$ | sequential elements of b concatenated with 0s | sequential elements of b repeated T times |
| STORE | | |
| $C_{back}$ | c in the 1st col | c in the 1st row |
| EXECUTE | | |
| Swap | yes | yes |
| K | T | T |
| Operation | =for 1st cycle; +=for subsequent cycles | =for 1st cycle; +=for subsequent cycles |

Matrix-Vector Multiplication ($c=A*b$—A in Column Major Order)

Some preferred embodiments may implement matrix-vector multiplication of the form $c=A*b$ with A in column major order. The following tables provide CONFIGURATION and COMPUTATION details for BLOCK BASED (OPTION 1) and BLOCK BASED (OPTION 2) matrix operations for this OPM operator.

| Matrix-Vector Multiplication (c = A * b with A in column major order) CONFIGURATION | | |
| --- | --- | --- |
| | BLOCK BASED (OPTION 1) | BLOCK BASED (OPTION 2) |
| Input data type | precision, sign | precision, sign |
| Output data type | precision, sign | precision, sign |
| M | block rows | block rows |
| N | block cols | block cols |
| $D_{fore}$ | 1s for 1st col of each block; 0s elsewhere | 1s for diagonals of each block; 0s elsewhere |
| $R_{fore}$ | all 0s | full size ramp |
| Scalar/vector output | vector | vector |
| Point-wise nonlinearity | disable | disable |
| Round/shift | type and value | type and value |

| Matrix-Vector Multiplication (c = A * b with A in column major order) COMPUTATION | | |
| --- | --- | --- |
| FUNCTION/ Operands | BLOCK BASED (OPTION 1) | BLOCK BASED (OPTION 2) |
| LOAD | | |
| $a_{fore}$ | sequential cols of all blocks of A concatenated horizontally | sequential cols of all blocks of A concatenated horizontally |
| $b^T{fore}$ | sequential elements of all b vectors spaced with N-1 0s concatenated | sequential elements of all b vectors repeated N times concatenated |
| STORE | | |
| $C_{back}$ | all cs concatenated vertically in the 1st col | all cs concatenated horizontally in the 1st row |
| EXECUTE | | |
| Swap | yes | yes |
| K | block inner dimension | block inner dimension |
| Operation | =for 1st cycle; +=for other cycles | =for 1st cycle; +=for other cycles |

Vector-Vector Inner Product ($c=a^T*b$)

Some preferred embodiments may implement vector-vector inner product of the form $c=a^T*b$. The following tables provide CONFIGURATION and COMPUTATION details for FULL SIZE matrix operations for this OPM operator.

| Vector-Vector Inner Product ($c = a^T * b$) CONFIGURATION | |
| --- | --- |
| | FULL SIZE |
| Input data type | precision, sign |
| Output data type | precision, sign |
| M | T |
| N | T |
| $D_{fore}$ | 1s for diagonals of each block; 0s elsewhere |
| $R_{fore}$ | full size ramp |
| Scalar/vector output | scalar |
| Point-wise nonlinearity | disable |
| Round/shift | type and value |

| Vector-Vector Inner Product ($c = a^T * b$) COMPUTATION | |
| --- | --- |
| FUNCTION/Operands | FULL SIZE |
| LOAD | |
| $a_{fore}$ | a vector |
| $b^T{fore}$ | b vector |
| STORE | |
| $C_{back}$ | c in the scalar |
| EXECUTE | |
| Swap | yes |
| K | 1 |
| Operation | =for all cycles |

Matrix Transpose ($C=A^T=A^T*I$)

Some preferred embodiments may implement matrix transposition of the form $C=A^T=A^T*I$. The following tables provide CONFIGURATION and COMPUTATION details for FULL SIZE and BLOCK BASED matrix operations for this OPM operator.

| Matrix Transpose ($C = A^T = A^T * I$) CONFIGURATION | | |
| --- | --- | --- |
| | FULL SIZE | BLOCK BASED |
| Input data type | precision, sign | precision, sign |
| Output data type | precision, sign | precision, sign |
| M | T | block rows |
| N | T | block cols |
| $D_{fore}$ | 1s for 1st col of each block + circular increment | 1s for 1st col of each block + circular increment |
| $R_{fore}$ | all 0s | block offset (N entries of 0, N entries of M, N entries of 2 * M, ...) |
| Scalar/vector output | vector | vector |
| Point-wise nonlinearity | disable | disable |
| Round/shift | type and value | type and value |

| Matrix Transpose ($C = A^T = A^T * I$) COMPUTATION | | |
| --- | --- | --- |
| FUNCTION/Operands | FULL SIZE | BLOCK BASED |
| LOAD | | |
| $a_{fore}$ | sequential row of A | sequential rows of all blocks of A concatenated horizontally |
| $b^T_{fore}$ | sequential rows of I | sequential rows of all blocks of I concatenated horizontally |
| STORE | | |
| $C_{back}$ | sequential rows of C | sequential rows of all blocks of C concatenated horizontally (M rows to save) |
| EXECUTE | | |
| Swap | yes | yes |
| K | T | block rows |
| Operation | =for 1st cycle; +=for other cycles | =for 1st cycle; +=for other cycles |

Matrix Row Permute ($C=A(permute, :)*B$)

Some preferred embodiments may implement matrix row permutations for matrix B(permute, :) of the form $C=A$(permute, :)*B where row permutation of a matrix B is computed by multiplying a matrix B with a row permutation matrix A. The following tables provide CONFIGURATION and COMPUTATION details for FULL SIZE and BLOCK BASED matrix operations for this OPM operator.

| Matrix Row Permute ($C = A(permute, :) * B$) CONFIGURATION | | |
| --- | --- | --- |
| | FULL SIZE | BLOCK BASED |
| Input data type | precision, sign | precision, sign |
| Output data type | precision, sign | precision, sign |
| M | T | block rows |
| N | T | block cols |
| $D_{fore}$ | 1s for all values of each block; 0s elsewhere | 1s for all values of each block; 0s elsewhere |
| $R_{fore}$ | block offset (N entries of 0, ...) | block offset (N entries of 0, N entries of M, N entries of 2 * M, ...) |
| Scalar/vector output | vector | vector |
| Point-wise nonlinearity | disable | disable |
| Round/shift | type and value | type and value |

| Matrix Row Permute ($C = A(permute, :) * B$) COMPUTATION | | |
| --- | --- | --- |
| FUNCTION/Operands | FULL SIZE | BLOCK BASED |
| LOAD | | |
| $a_{fore}$ | sequential columns of permutation matrix A | sequential columns of all blocks of permutation matrix A concatenated vertically |
| $b^T_{fore}$ | sequential rows of B | sequential rows of all blocks of B concatenated horizontally |
| STORE | | |
| $C_{back}$ | sequential rows of C | sequential rows of all blocks of C concatenated horizontally (M rows to save) |
| EXECUTE | | |
| Swap | yes | yes |
| K | T | block inner dimension |
| Operation | for 1st cycle; +=for other cycles | for 1st cycle; +=for other cycles |

Vector Column Permute ($c=a(permute)$)

Some preferred embodiments may implement vector column permutation of the form $c=a(permute)$. The following tables provide CONFIGURATION and COMPUTATION details for FULL SIZE matrix operations for this CPM operator.

| Vector Column Permute ($c = a (permute)$) CONFIGURATION | |
| --- | --- |
| | FULL SIZE |
| Input data type | precision, sign |
| Output data type | precision, sign |
| M | T |
| N | T |
| $D_{fore}$ | 1s for 1st row of each block; 0s elsewhere |
| $R_{fore}$ | permutation pattern |
| Scalar/vector output | vector |
| Point-wise nonlinearity | disable |
| Round/shift | type and value |

| Vector Column Permute (c = a (permute)) COMPUTATION | |
|---|---|
| FUNCTION/Operands | FULL SIZE |
| LOAD | |
| $a_{fore}$ | a vector |
| $b^T_{fore}$ | all 1s |
| STORE | |
| $c_{back}$ | c in the 1st row |
| EXECUTE | |
| Swap | yes |
| K | 1 |
| Operation | =for all cycles |

System Summary

An example system includes an outer product multiplier (OPM) system comprising:
  (a) external data memory (EDM);
  (b) A-multiplier-matrix (AMM) registered storage memory;
  (c) B-multiplicand-matrix (BMM) registered storage memory;
  (d) C-product-matrix (CPM) registered storage memory;
  (e) hierarchical multiplication array logic (HMA);
  (f) computation decision matrix register (CDM); and
  (g) circular column rotation vector register (CRV);
wherein:
  the EDM is selectively electrically coupled to the AMM;
  the EDM is selectively electrically coupled to the BMM;
  the EDM is selectively electrically coupled to the CPM;
  the AMM comprises a registered storage memory matrix having at least one column of M rows;
  the BMM comprises a registered storage memory organized as a matrix having a least one row of N columns;
  the CPM comprises a registered storage memory organized as a matrix having M rows and N columns;
  the HMA is configured to calculate a simultaneous M×N outer product matrix computation of a column of the AMM and a row of the BMM and produce a resulting M×N matrix product result (MPR);
  the HMA gates execution of the simultaneous M×N outer product matrix computation based on computation gating data contained in the CDM; and
  the HMA routes the MPR to the CPM based on shifting data contained in the CRV.

This general system summary may be augmented by the various elements described herein to produce a wide variety of embodiments consistent with this overall design description.

Method Summary

An example method includes an outer product multiplier (OPM) method operating on outer product multiplier (OPM) system, the system comprising:
  (a) external data memory (EDM);
  (b) A-multiplier-matrix (AMM) registered storage memory;
  (c) B-multiplicand-matrix (BMM) registered storage memory;
  (d) C-product-matrix (CPM) registered storage memory;
  (e) hierarchical multiplication array logic (HMA);
  (f) computation decision matrix register (CDM); and
  (g) circular column rotation vector register (CRV);
wherein:
  the EDM is selectively electrically coupled to the AMM;
  the EDM is selectively electrically coupled to the BMM;
  the EDM is selectively electrically coupled to the CPM;
  the AMM comprises a registered storage memory matrix having at east one column of M rows;
  the BMM comprises a registered storage memory organized as a matrix having at least one row of N columns;
  the CPM comprises a registered storage memory organized as a matrix having M rows and N columns;
  the HMA is configured to calculate a simultaneous M×N outer product matrix computation of a column of the AMM and a row of the BMM and produce a resulting M×N matrix product result (MPR);
  the HMA gates execution of the simultaneous M×N outer product matrix computation based on computation gating data contained in the CDM; and
  the HMA routes the MPR to the CPM based on shifting data contained in the CRV;
wherein the method comprises the steps of:
  (1) loading the AMM and the BMM from the EDM (1701);
  (2) with the HMA, performing matrix outer product (MOP) computations of the AMM with the BMM, the MOP computations gated by the contents of the CDM to produce a matrix gated computation (MGC) (1702);
  (3) shifting the MGC based on the contents of the CRV to produce a matrix shifted computation (MSC) result (1703); and
  (4) assigning or accumulating the MSC result to the CPM (1704).

This general method may be modified heavily depending on a number of factors, with rearrangement and/or addition/deletion of steps anticipated by the scope of the present disclosure. Integration of this and other preferred exemplary embodiment methods in conjunction with a variety of preferred exemplary embodiment systems described herein is anticipated by the overall scope of the present disclosure.

System/Method Variations

A wide variety of variations in the basic theme of construction may be used to implement the techniques of this disclosure. The examples presented previously do not represent the entire scope of possible usages. They are meant to cite a few of the almost limitless possibilities.

This basic system and method may be augmented with a variety of ancillary embodiments, including but not limited to;
  An embodiment wherein the HMA gates matrix product computations based on the CDM and the CDM is defined based on M and N matrix sizing parameters specifying a block batch size and a parameter K specifying cycles per inner matrix dimension parameter, the configuration selected from a group of built-in matrix formats consisting of: all-1s; all-1s for all values of each block and all-0s elsewhere; for diagonals of each block and all-0s elsewhere; static all-1s for a first row of each block and all-0s elsewhere; circular rotation increment all-1s for a first row of each block and all-0s elsewhere with circular row rotation increment for each compute cycle; static all-1s for a first column of each block and all-0s elsewhere; and all-1s for a first column of each block and all-0s elsewhere with circular column rotation increment for each compute cycle.

An embodiment wherein the HMA gates matrix product computations based on the CDM and the CDM is defined based on programmable arbitrary data loaded from the EDM.

An embodiment wherein the HMA shifts matrix product computation results to the CPM based on the CRV and the CRV is defined based on M and N matrix sizing parameters specifying a block batch size and a parameter K specifying cycles per inner matrix dimension parameter, the configuration selected from a group of built-in vector formats consisting of: all-0s; static full size ramp; full size ramp with per cycle cyclical increment; static block ramp size N; block ramp size N with per cycle cyclical ramp; block offset (N entries of 0, N entries of M, N entries of 2*M, . . . ); and block offset+block ramp.

An embodiment wherein the HMA shifts matrix product computation results to the CPM based on the CRV and the CRV is defined based on arbitrary programmable shifting data loaded from the EDM.

An embodiment wherein the HMA is configured to add a column offset to row select operations during the simultaneous M×N outer product matrix computation.

An embodiment wherein the HMA is configured to route and assign computed data to the CPM based on shifting data contained in the CRV.

An embodiment wherein the HMA is configured to route and accumulate computed data to the CPM based on shifting data contained in the CRV.

An embodiment wherein the HMA is configured to perform an assignment/accumulation operation on the CPM, the assignment/accumulation operation selected from a group consisting of: for first cycle and += for subsequent cycles; = for all cycles; and += for all cycles.

An embodiment wherein the HMA implements a matrix function operator (MFG) selected from a group consisting of: matrix-matrix multiplication; matrix-matrix point-wise multiplication; matrix-matrix addition; matrix-matrix assignment; vector-vector point-wise multiplication; vector-vector addition; vector-vector assignment; matrix-vector multiplication; vector-vector inner product; matrix transpose; matrix row permute; and vector-column permute.

Other embodiments are possible based on combinations of elements taught within the above disclosure.

Generalized Computer Usable Medium

In various alternate embodiments, example embodiments may be implemented as a computer program product for use with a computerized computing system. Those skilled in the art will readily appreciate that programs defining the functions defined by example embodiments can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the disclosed methods, such computer readable media represent alternate embodiments of the present disclosure.

As generally illustrated herein, the disclosed system embodiments can incorporate a variety of computer readable media that comprise computer usable medium having computer readable code means embodied therein. The software associated with the various processes described herein can be embodied in a wide variety of computer accessible media from which the software is loaded and activated. Pursuant to In re Beauregard, 35 USPQ2d 1383 (U.S. Pat. No. 5,710,578), the present disclosure anticipates and includes this type of computer readable media within the scope of the disclosure. Pursuant to In re Nuijten, 500 F.3d 1346 (Fed. Cir. 2007) (U.S. patent application Ser. No. 09/211,928), the present disclosure scope is limited to computer readable media wherein the media is both tangible and non-transitory.

An outer product multiplier (OPM) system/method that integrates compute gating and input/output circular column rotation functions to balance time spent in compute and data transfer operations while limiting overall dynamic power dissipation has been disclosed. Matrix compute gating (MCG) based on a computation decision matrix (CDM) limits the number of computations required on a per cycle basis to reduce overall matrix compute cycle power dissipation. A circular column rotation vector (CRV) automates input/output data formatting to reduce the number of data transfer operations required to achieve a given matrix computation result. Matrix function operators (MFO) utilizing these features are disclosed and include: matrix-matrix multiplication; matrix-matrix and vector-vector point-wise multiplication, addition, and assignment; matrix-vector multiplication; vector-vector inner product; matrix transpose; matrix row permute; and vector-column permute.

Although a preferred embodiment of the present disclosure has been illustrated in the accompanying drawings and described in the foregoing Detailed Description, it will be understood that the disclosure is not limited to the embodiments disclosed, but is capable of numerous rearrangements, modifications, and substitutions without departing from the spirit of the disclosure as set forth and defined by the following claims.

What is claimed is:

1. A system comprising:
    (a) an external data memory having an input, an A-matrix output and a B-matrix output;
    (b) an outer product matrix multiplier having a first input, a second input, a control input, an opcode input, and a C-matrix output, the first input is coupled to the A-matrix output of the external data memory, and the second input is coupled to the B-matrix output of the external data memory;
    a streaming engine pipeline with a mode output and a function output, the mode output coupled to the control input of the outer product matrix multiplier.

2. The system of claim 1, further comprising an application control logic having a mode output, an execute output, a function output and wherein the streaming engine pipeline has a mode input, an execute input, and a function input, the mode output of the application control logic is coupled to the mode input of the streaming engine pipeline, the execute output of the application control logic is coupled to the execute input of the streaming engine pipeline, and the function output of the application control logic is coupled to the function input of the streaming engine pipeline.

3. The system of claim 1 wherein the streaming engine pipeline has a mode input and a function input and the external data memory storage has a mode output and a function output.

4. An outer product multiplier (OPM) method, the method comprises:
(1) loading a A-multiplier-matrix (AMM) and a B-multiplicand-matrix (BMM) from an external data memory (EDM);
(2) with a hierarchical multiplication array logic (HMA), performing matrix outer product (MOP) computations of said AMM with said BMM, said MOP computations gated by the contents of a computation decision matrix register (CDM) to produce a matrix gated computation (MGC);
(3) shifting said MGC based on the contents of a circular column rotation vector register (CRV) to produce a matrix shifted computation (MSC) result; and
(4) assigning or accumulating said MSC result to a C-product-matrix register (CPM).

5. The outer product multiplier (OPM) method of claim 4 wherein said HMA gates matrix product computations based on said CDM and said CDM is defined based on M and N matrix sizing parameters specifying a block batch size and a parameter K specifying cycles per inner matrix dimension parameter, said configuration selected from a group of built-in matrix formats consisting of: all-1s; all-1s for all values of each block and all-0s elsewhere; all-1s for diagonals of each block and all-0s elsewhere; static all-1s for a first row of each block and all-0s elsewhere; circular rotation increment all-1s for a first row of each block and all-0s elsewhere with circular row rotation increment for each compute cycle; static all-1s for a first column of each block and all-0s elsewhere; and all-1 s for a first column of each block and all-0s elsewhere with circular column rotation increment for each compute cycle.

6. The outer product multiplier (OPM) method of claim 4 wherein said HMA gates matrix product computations based on said CDM and said CDM is defined based on programmable arbitrary data loaded from said EDM.

7. The outer product multiplier (OPM) method of claim 4 wherein said HMA shifts matrix product computation results to said CPM based on said CRV and said CRV is defined based on M and N matrix sizing parameters specifying a block batch size and a parameter K specifying cycles per inner matrix dimension parameter, said configuration selected from a group of built-in vector formats consisting of: all-0s; static full size ramp; full size ramp with per cycle cyclical increment; static block ramp size N; block ramp size N with per cycle cyclical ramp; block offset (N entries of 0, N entries of M, N entries of 2*M, . . . ); and block offset+block ramp.

8. The outer product multiplier (OPM) method of claim 4 wherein said HMA shifts matrix product computation results to said CPM based on said CRV and said CRV is defined based on arbitrary programmable shifting data loaded from said EDM.

9. The outer product multiplier (OPM) method of claim 4 wherein said HMA is configured to add a column offset to row select operations during said simultaneous MxN outer product matrix computation.

10. The outer product multiplier (OPM) method of claim 4 wherein said HMA is configured to route and assign computed data to said CPM based on shifting data contained in said CRV.

11. The outer product multiplier (OPM) method of claim 4 wherein said HMA is configured to route and accumulate computed data to said CPM based on shifting data contained in said CRV.

12. The outer product multiplier (OPM) method of claim 4 wherein said HMA is configured to perform an assignment/accumulation operation on said CPM, said assignment/accumulation operation selected from a group consisting of: = for first cycle and += for subsequent cycles; = for all cycles; and += for all cycles.

13. The outer product multiplier (OPM) method of claim 4 wherein said HMA implements a matrix function operator (MFO) selected from a group consisting of:
matrix-matrix multiplication; matrix-matrix point-wise multiplication; matrix-matrix addition; matrix-matrix assignment; vector-vector point-wise multiplication; vector-vector addition; vector-vector assignment; matrix-vector multiplication; vector-vector inner product; matrix transpose; matrix row permute; and vector-column permute.

* * * * *